US008484146B2

(12) United States Patent
Movellan et al.

(10) Patent No.: US 8,484,146 B2
(45) Date of Patent: Jul. 9, 2013

(54) INTERACTION DEVICE IMPLEMENTING A BAYESIAN'S ESTIMATION

(75) Inventors: Javier R. Movellan, La Jolla, CA (US); Fumihide Tanaka, Kanagawa (JP)

(73) Assignees: Sony Corporation, Tokyo (JP); University of California, San Diego Regents of University of California, Oakland, CA (US)

( * ) Notice: Subject to any disclaimer, the term of this patent is extended or adjusted under 35 U.S.C. 154(b) by 856 days.

(21) Appl. No.: 11/654,103

(22) Filed: Jan. 17, 2007

(65) Prior Publication Data

US 2007/0198444 A1    Aug. 23, 2007

Related U.S. Application Data

(60) Provisional application No. 60/759,736, filed on Jan. 18, 2006, provisional application No. 60/789,348, filed on Apr. 5, 2006.

(51) Int. Cl.
*G06N 5/00* (2006.01)

(52) U.S. Cl.
USPC ............................................. 706/45; 700/245

(58) Field of Classification Search
CPC ....................................................... G06N 5/022
USPC ........................................... 706/45; 700/245
See application file for complete search history.

(56) References Cited

U.S. PATENT DOCUMENTS 6,212,466 B1 *  4/2001  Ulyanov et al. ................... 701/99
6,347,261 B1 *  2/2002  Sakaue et al. ................... 700/245
6,714,840 B2 *  3/2004  Sakaue et al. ................... 700/245
2002/0178005 A1 * 11/2002  Dusan et al. ................... 704/254
2005/0102246 A1 *  5/2005  Movellan et al. ............... 706/12
2006/0020368 A1 *  1/2006  Tanaka ........................... 700/245

OTHER PUBLICATIONS

"Infomax Control as a Model of Real Time Behavior: Theory and Application to the Detection of Social Contingency", Javier R. Movellan, May 5, 2005, University of California San Diego, pp. 1-26.*
"Finding People by Contingency: An Infomax Controller Approach", Javier R. Movellan, International Conference on Developmental Learning, 2004, pp. 1-2.*
"Rubi: A Robotic Platform for Real-time Social Interaction", Bret Fortenberry et al, 2004, In Proceedings of the International Conference on Development and Learning (ICDL04), pp. 1-4.*
"The RUBI/QRIO Project: Origins, Principles and First Steps", Movellan et al, 2005, In Proceedings of the International Conference on Development and Learning (ICDL05), pp. 1-7.*
"Task Model of Lower Body Motion for a Biped Humanoid Robot to Imitate Human Dances", Nakaoka, S., Nakazawa, A., Kanehiro, F., Kaneko, K., Morisawa, M., Ikeuchi, K., Intelligent Robots and Systems, 2005, IEEE/RSJ International Conference on, Aug. 2-6, 2005, pp. 3157-3162.*

(Continued)

*Primary Examiner* — Kakali Chaki
*Assistant Examiner* — Mai T Tran
(74) *Attorney, Agent, or Firm* — Frommer Lawrence & Haug LLP; William S. Frommer

(57) ABSTRACT

The present invention provides an interaction device adapted for setting own controller for maximizing expectation of information defined between a hypothesis about an interaction object and own input/output. Thus, the social robot can judge by using only simple input/output sensor whether or not the human being is present or absent at the outside world.

9 Claims, 12 Drawing Sheets

OTHER PUBLICATIONS

"The development of gaze following as a Bayesian systems identification problem", Movellan, J.R., Watson, J.S., Development and Learning, 2002, Proceedings. The 2$^{nd}$ International Conference on, pp. 34-40.*

Abstract of Tracking motion, deformation. and texture using conditionally Gaussian processes, Marks, T.K.; Hershey, J.R.; Movellan, J.R. IEEE Transactions on Pattern Analysis and Machine Intelligence 2010 Feb. 2010 32 2 IEEE Trans. Pattern Anal. Mach. Intell. (USA).

Abstract of Detecting driver drowsiness using computer vision techniques Vuml, E.; Celln, M.; Eroil, A.; Littlewort, G.; Bartlett, M.; Movellan, J. 2008 IEEE 16th Signal Processing, Communication and Applications Conference (SIU) 2008.

Abstract of a barebones communicative robot based on social contingency and Infomax control, Tanaka, F.; Movellan, J.R. 2008 RO-MAN: The 17th IEEE International Symposium on Robot and Human Interactive Communication.

Abstract of Automatic facial expression recognition for intelligent tutoring systems, Whitehill, J.; Bartlett, M.; Movenan, J. 2006 IEEE Computer Society Conference on Computer Vision and Pattern Recognition Workshops (CVPR Workshops).

Abstract of Auditory mood detection for social and educational robots Ruvolo, P.; Fesel, I.; Movellan, J. 2008 IEEE . International Conference on Robotics and Automation. The Half-Day Workshop on: Towards Autonomous Agriculture of Tomorrow.

Abstract of Visual saliency model for robot cameras, Butko, N.J.; Lingyun Zhang; Cottrell, G.W,; Movellan. J,R. 2008 IEEE International Conference on Robotics and Automation. The Half-Day Workshop on: Towards Autonomous Agriculture of Tomorrow.

Abstract of Learning to learn Butko, N.J.; Movellan, J.R. 20076th IEEE International Conference on Development 'and Learning 2007.

Abstract of Drowsy driver detection through facial movement analysis VUral, E.; Cetin, M.; Ercil, A.; Liltlewort, G.; Bartlett, M.; Movellan, Human-Computer Interaction. Proceedings of the 2007 IEEE Intl Conf.

Abstract of Automatic recognition of facial actions in spontaneous expressions, Bartlett, M.S.; Littlewort, G,C.; Frank, M.G.; Lainscsek, C., Fasel, I.R.; Movellan, J.R., Journal of Multimedia Sep. 2006.

Abstract of Development of face-to-face communication function for a humanoid robot Shloml, M.; Kanda, T.; Mlralles, N,: .Miyashita, T.; Fasel, I.; Movellan, J.; Ishiguro, H. Systems and Computers in Japan Dec. 2006.

Abstract Behavior analysis of children's touch on a small humanoid robot: long-term observation at a daily classrom over. three months Tanaka, F.; Movellan, J.R. RO-MAN 2006: The 15th IEEE International Symposium on Robot and. Human Interactive Communication (IEEE Cat No. 06TH8907) 2006.

Abstract of Fully automatic facial action recognition in spontaneous behavior Bartlett, M.S.;Littlewort. G.; Frank, M.; Lainscsek, C.; Pasel, I.; Movellan, .)., Proceedings of the 7th International Conference on Automatic Face and Gesture Recognition, 2006.

Abstract of Dynamics of facial expression extracted' automatically from video. Littlewort; G.; Bartlett M.S.; Fasel, I. Susskind, J.; Movellan J., CVPRW'04 Conference on Jun. 2004.

Abstract of an Infomax controller for real time detection of social contingency, Movellan, J.R. 2005 4th IEEE International Conference on Development and Learning (IEEE Cat. No. 05EX1079).

Abstract of Recognizing facial expression: machine learning and application to spontaneous behavior Bartlett, M.S.; . Littlewort, G.; Frank, M.; Lainscsek, C.; Fasel, I.; Movellan, J. IEEE Computer Society Conference on Computer Vision and Pattern Recognition, Jun. 2005.

Abstract of Investigating the emergence of shared attention through an embodied computational modeling approach: a progress report Triesch J.; Carlson, E.; Deak, G.; Movellan, J. Proceedings of the International Joint Conference on Neural Networks 2003 (Cat. No. 03CH37464) ,.

Abstract of a generative framework for real time object detection and classification, Fasel, I.; Fortenberry, S.; Movellan, J ., Computer Vision and Image Understanding 2005.

Abstract of Face-to-face interactive humanoid robot, Shiomi, M.; Kanda, T.; Miralles, N.; Miyashita, T.; Fasel, I.; Movellan, J.: Ishiguro, H. ,2004 IEEE/RSJ International Conference on Intelligent Robots and Systems (IROS) (IEEE Cat.No. 04CH37566).

Abstract of Machine learning methods for fully automatic recognition of facial expressions and facial actions Bartlett, M.S.; Littlewort, G.; Lainscsek, C.; Fasel, I Movellan) J., 2004 IEEE International Conference on Systems, Man and Cybernetics (IEEE Cat. No. 04CH37S83).

Abstract of Spike count distributions, factorability, and contextual effects in area V1 Schwartz. 0.; Movellan, J.R.; Wachtler, T.; Albright, T.D.; Sejnowski, T.J., Neurocomputing 2004.

Abstract of Perceptive animated Interfaces: first steps toward a new paradigm for human-computer interaction, Cole, R; Van Vuuren, S.; Pellom, B.; Hacioglu, K.; Jiyong Ma; MoveJlan, J.; Schwartz, S.; Wade-Stein, D.; Ward, W.; Jie Yan,Proceedings of the IEEE 2003 .

Abstract of Face recognition by independent component analysis, Bartlett, M.S.; Movellan, J.R.; SeJnowskl, T.J .. IEEE Transactions on Neural Networks 2002.

Abstract of the development of gaze following as a Bayesian systems identification problem, Movellan, J.R.; Watson, J. S. Proceedings 2nd International Conference on Development and Learning. ICDL 2002.

Abstract of Combining embodied models and empirical research for understanding the development of shared attention Fasel, I.; Deak, G.O.; Triesch, J.; Movellan, J., 'Proceedings 2nd International Conference on Development and Learning. ICDL2002.

Abstract of a Monte Carlo EM approach for partially observable diffusion processes: theory and applications to neural networks Movellan, J.R; Mineiro, P.; Williams, R.J .•Neural Computation 2002.

Abstract of an approach to automatic recognition of spontaneous facial actions Braathen, B.; Bartlett, M.S.; Littlewort, G.; Smith, E.; Movellan, J.R., Proceedings of Fifth IEEE International Conference on Automatic Face Gesture Recognition 2002.

Abstract of a comparison of Gabor filter methods for automatic detection of facial landmarks, Fasel. I.R.; Bartlett, M.S.; Movellan. J .R. , Proceedings of Fifth IEEE International Conference on Automatic Face Gesture Recognition 2002.

Abstract of Robust sensor fusion: analysis and application to audio visual speech recognition, Movellan, J ,R.; Mineiro, P., . Machine Learning 1998.

Abstract of a learning theorem for networks at detailed stochastic equilibrium Movellan, J.R. Neural Computalion1998.

Abstract of Dynamic features for visual speech-reading: a systematic comparison. Gray. M.S.; Movellan, J.R.; SeJnowskl. T.J, Advances in Neural Information Processing Systems 9. Proceedings of the 1996 Conference.

Abstract of Visual speech recognition with stochastic networks, Movellan, J.R. Tesauro, G,; Touretzky, D.; Leen, Advances in Neural Information Processing Systems 7 1995.

Abstract of Covariance learning rules for stochastic neural networks Movellan, J.R.; McClelland, J. L. World Congress on Neural Networks—San Diego, 1994 International Neural Network Society Annual Meeting 1994.

Abstract of Learning continuous probability distributions with symmetric diffusion networks, Movellan, J,R.; McClelland, J,L Cognitive Science, 1993.

Abstract of Benefits of gain: speeded learning and minimal hidden layers in back-propagation networks,' Kruschke, J.K.;Movellan. J.R., IEEE Transactions on Systems, Man and Cybernetics 1991.

Abstract of Robust back-propagation: connectionist learning algorithms resistant to various types of noise, Movellan, J.R.. IJNN: International Joint Conference on Neural Networks (Cat. No.89CH2765-6) 1989;.

Abstract of Mechanical/electrochemical complex machining method for efficient, accurate, and environmentally benign process, Kl.lrita, T,; Endo, C.; Matsui, Masuda, H.; Terasaw8, K.; Tanaka, F.; Ikeda, H.; Oguchi, K; Kobayashi, K.. International Journal of Machine Tools & Manufacture 2008.

Abstract of a barebones communicative robot based on social contingency and Infomax control, Tanaka, F.; Movellan, J.R,. 2008 RO-MAN: The 17th IEEE International Symposium on Robot and Human Interactive Communication.

Abstract of Behavior analysis of children's touch on a small humanoid robot long-term observation at a daily classroom over three months. Tanaka, F.; Movellan, J.R., RO-MAN 2006: The 15th IEEE International Symposium on Robot and Human Interactive Communication (IEEE Cat No. 06TH8907) 2006.

Abstract of Daily HRI evaluation at a classroom environment—reports from dance interaction experiments, Tanaka, F.; Movellan, J.R.; Fortenberry, B.; Alsaka, K, 1st Annual Conference on Human-Robot Interaction 2006.

Abstract of Developing dance Interaction between QRIO and toddlers in a classroom environment: plans for the first steps, Tanaka, F.; Fortenberry, S.; Alsaka, K; Movellan, J.R., 2005 IEEE International Workshop on Robot and Human Interactive Communication (IEEE Cat. No. 05TH8623).

Abstract of Plans for developing real-time dance Interaction between QRIO and toddlers in a classroom environment, Tanaka, F.; Fortenberry, B.; Aisaka, K; Movellan, JR .• 2005 4th IEEE International Conference on Development and Learning (IEEE Cat. No. 05EX1079).

Abstract of the RUBI/QRIO project: origins, principles, and first steps Movellan, J.R.; Tanaka, F.; Fortenberry, B.; Aisaka, K., 2005 4th IEEE International Conference on Development and Learning (IEEE Cat. No. 05EX1079).

Abstract of Dance/Interaction with ORIO: a case study for non-boring interaction by using an entrainment ensemble model, Tanaka, F.; Suzuki, H. , RO-MAN 2004. 13th IEEE International Workshop on Robot and Human Interactive Communication (IEEE Catalog No. 04TH8759)2004.

Abstract of G.C. Littlewort, M.S. Bartlett, I. Fasel, J. Chenu, T. Kanda, H. Ishiguro (2004). J.R. Movellan, Facial Expression in Social Interactions: Automatic Evaluation of Human-Robot Interaction, The Third International Conference on Development and Learning.

B. Fortenberry, J. Chenu and J. Movellan, "RUBI: A Robotic Platform for Real time Social Interaction", Third International Conference on Development and Learning (ICDL'04), 2004, pp. 1-4.

* cited by examiner

50

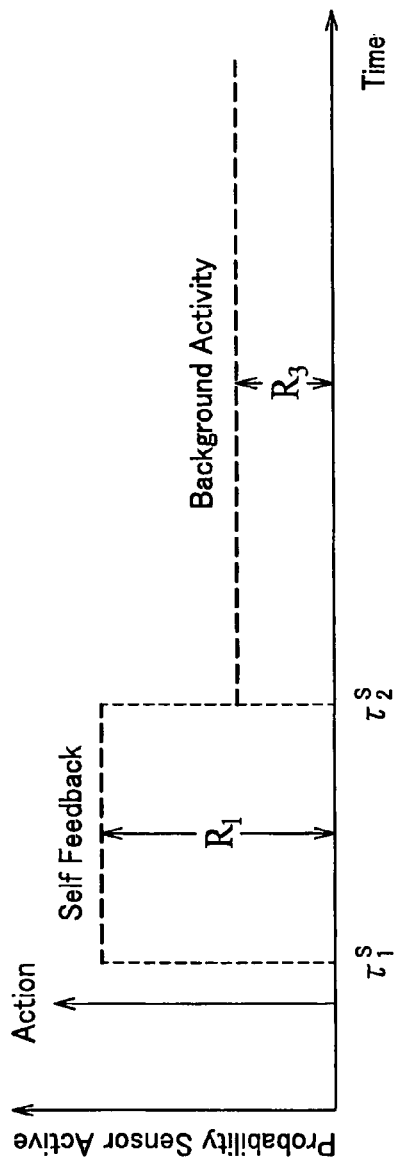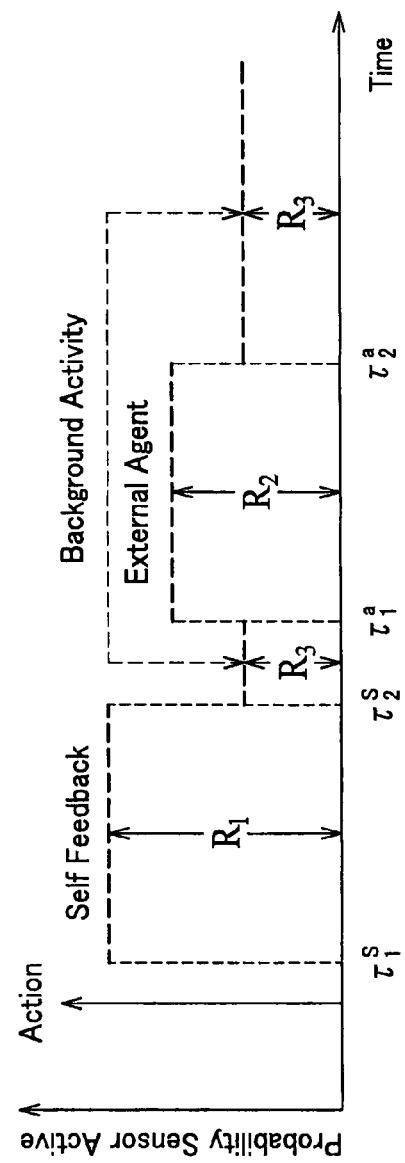
FIG.5A
FIG.5B

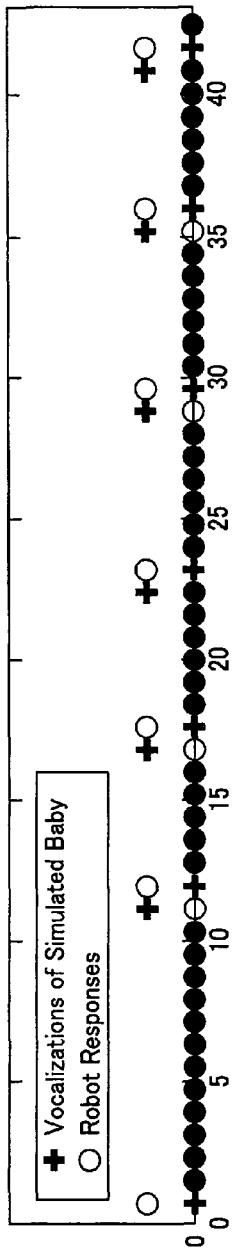
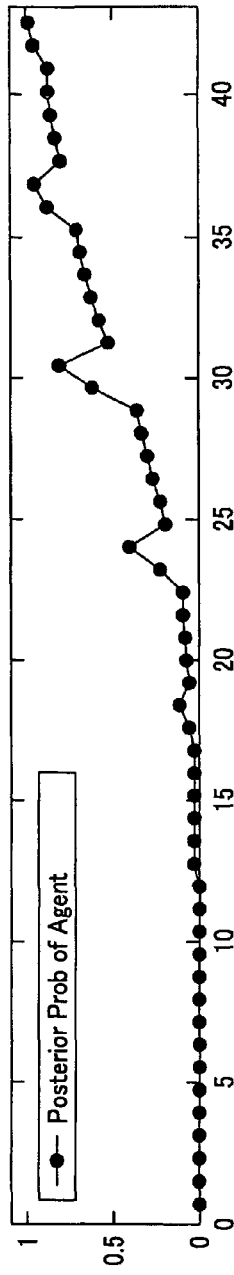
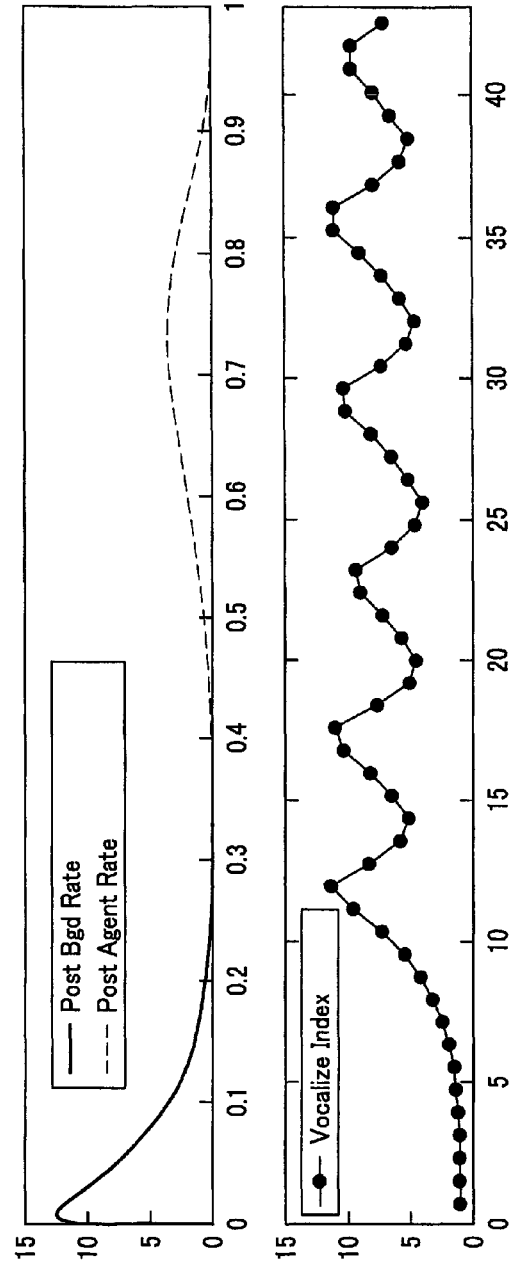
FIG.7A
FIG.7B
FIG.7C
FIG.7D

INTERACTION DEVICE IMPLEMENTING A BAYESIAN'S ESTIMATION

CROSS REFERENCES TO RELATED APPLICATIONS

This application claims priority from U.S. Provisional Application No. 60/759,736, filed Jan. 18, 2006 and U.S. Provisional Application No. 60/789,348, filed Apr. 5, 2006, which are entitled to the priority filing dates of Jan. 18, 2006, Japanese Application Number 2006-010118, filed Jan. 18, 2006, and Jul. 14, 2006, Japanese Application Number 2006-194827, filed Jul. 14, 2006.

BACKGROUND OF THE INVENTION

1. Field of the Invention

The present invention relates to an interaction device which permits more close interaction between robot and user.

2. Description of Related Art

The concept of the idea of Infomax in perception is retroactive to the study by Linsker, etc. al (e.g., see non-Patent Literatures 2, 12).

This approach has been generalized as non-Gaussian circuit network by Bell and Sejnowski so that Infomax ICA is provided. The Infomax constitutes the important theoretical tool in the computational neuro-science. However, the greater part of this study is viewed from passive point of view of Infomax. The goal of the Infomax processor is to easily send information as many as possible relating to input to the next processing stage. On the other hand, the Infomax control acts together with active processor which can schedule action or behavior in order to discover hypothesis of interest as quickly as possible. For example, neuron can be also rapidly increased in order to discover the relation state with the world as quickly as possible through feedback connection instead of simply transmitting information. Similar inductive concept relating to active role of neuron has been formularized in the form of epicurean neuron hypothesis by Kupuroph.

The problem to schedule behavior in order to discover contingency is related to two-armed bandit problem from a formal point of view. In the classical two-armed problem, in order to determine which one of two levers maximizes the return speed, it is necessary to pull or draw either of two levers. We have amended the problem so that a supplemental hidden variable H for determining whether two conditions thereof are equal or not is included. Accordingly, in the two-armed problem, the goal is to determine which of two arms is superior, whereas in the contingency search problem, the goal is to determine whether or not there is a difference between two-arms. Such a delicate difference has important result. For example, in the standard two-armed bandit problem, only one arm is pulled or drawn plural times to thereby have an ability to make determination or judgment. This is because in the case where one of two arms brings about large return, this fact is the evidence that corresponding arm is already superior. However, in the contingency determination problem, information is unable to be obtained until two arms are pulled at least once.

Hitherto, various proposals are made in connection with the Infomax approaches with respect to perceive process or neuron process (e.g., see non-Patent Literatures 2, 11, 12, 20).

However, these models are passive in that design is made such that information is transmitted to the next processing stage. Instead, model which selects, with elapse of time, behavior for maximizing long-term gathering or collection of information is emphasized here.

The Infomax control can be also found in the tradition of the model of human motion control which explains the behavior of optimization problem (e.g., see non-Patent Literatures 5, 7, 13, 27)

However, the approach proposed here has inherent characteristic in that it can be applied to social action in which levels of scale in terms of time and uncertainty are far greater than the case of the traditional motion control problem.

Moreover, the ideas of information maximization to explain how people choose questions in concept learning tasks were used (see non-Patent Literatures 16, 17, 18).

Infomax-style control has also been proposed to understand how people move their eyes, or how an active camera could be moved to maximize data gathering about events of interest (e.g., see non-Patent Literatures 4, 8, 9, 10, 21).

However, these models do not address the following crucial issues:

(1) Previous models focused on explaining the ordering of behavior did not address the timing of behavior. For example, in [the non-Patent Literatures 16, 17, 18], concept learning is considered as an strict turn-taking activity in which subjects ask questions and given answers with no time constrains to have ability to give answer.

(2) Previous models did not solve the information maximization problem being raised. The models are "greedy" at best, and non causal at worst. For example, in [the non-Patent Literature 17], questions are asked that maximize the immediate information return, rather than the information returned in the long run.

In [the non-Patent Literature 10], the observer is allowed to first make all possible eye movements and then choose the eye movement that happened to provide the most information. This approach while useful for modeling purposes, is of non causal, i.e., generating the current saccade requires actually seeing the future.

In the field of robot technology, it has become popular to differentiate between behavioral and cognitive robot architectures (e.g., see non-Patent Literature 1).

Behavioral architectures are based on direct mappings between sensors and actuators. They emphasize the role of timing, and rapid reaction to changes in the environment. Cognitive architectures typically rely on planning and deliberative process, and the construction of world representations. Without proper mathematical grounding, concepts such as representation, deliberation and knowledge become almost meaningless. For example, the Infomax control framework presented here is reactive in that the controller is simply a causal mapping between sensor information and behaviors.

The idea of Infomax control is directly related to Bayesian approaches to sequential decision processes, and in particular to Bayesian solution or approaches to the n-armed bandit problem. The contribution in this paper is to show how this well known family of problems can be adapted to understand real time social interactions, and that mutual information can be used as a valid reinforcement signal.

Game theory, which can be regarded as a special case of the control theory, has a long history of applications to human social behavior, particularly in economics, and in the study of conflict. However, the importance of control to understand real time social behavior has been only recently appeared in the literature. The inventor, et al pointed out the potential value of stochastic optimal control, in particular of n-bandit problems, to understand the optimality of real time social interaction in [the non-Patent Literature 15]. Wolpert, Doya and Kawato proposed a unified framework for motion control and social interaction. Miyashita and Ishiguro pointed out that simple PID controllers can be used to produce communicative behaviors.

The simple social interactions will now be described.

1 CONTINGENCY DETECTION AND SOCIAL DEVELOPMENT

John Watson stated that contingency detection plays a crucial role in the social and emotional development of infants. In his view contingency is perceived by the human brain in a direct manner. Similarly, the brain perceives other elements or primitives like color or motion. In particular he proposed that early in infancy contingency is a fundamental source of information for the definition and recognition of caregivers (e.g see non-Patent Literatures 24, 25).

This view originated from an experiment in which 2-month-old infants learned to move their heads to activate a mobile above their cribs (e.g., see non-Patent Literature 24). Infants in the experimental group were presented with a mobile that responded to movements of the infant's head. For the infants in the control group, the mobile activated at the same rate as in the experimental group but in a random, non-contingent manner. After four 10 minute daily sessions of exposure to this mobile, and an average of approximately 200 responses, infants in the experimental group indicated significantly higher response rates than infants in the control group. More importantly, at about the same time, infants in the experimental group started displaying a number of social responses that are typically directed towards caregivers. These social reactions included intense social smiles, cooing, and positive affect towards the mobile. Watson stated that contingency was being used by these infants as a cue to define and identify con-specifics, and that this cue was more important than other perceptual cues, like the visual features of the human face.

Watoson formulated Poisson's model for social contingency judgment or determination. In this model, the background agent and the social agent were modeled as Poisson's process. In the first formulation by Watoson, the problem as how action is optimally scheduled was not handled. Instead, discovery comparison between probabilities which are not rapidly increased within the rage of interval of a predetermined length is handled.

In 1986, the inventor et. al conducted an experiment to test whether 10 month old infants use contingency information to detect novel social agents (e.g., see non-Patent Literatures 15, 19).

Infants were seated in front of a robot that did not look particularly human. The "head" was a rectangular prism whose sides contained geometric patterns (See FIG. 1(A)). The robot's head could flash lights on its surface, make sounds, and rotate to "face" right or left. Infants were randomly assigned to an experimental group or a control group. In the experimental group, the robot was programmed to respond to the environment in a manner that simulated the contingency properties of human beings. Each infant in the control group was matched to an infant in the experimental group and was presented the same temporal distribution of lights, sounds and turns of the central robot as was experienced by his/her matched participant. However, in the control group, the robot was not responsive to the infant's behavior or to any other events in the room.

Here, (A) of FIG. 1 is a schematic view of head portion 50 of robot used in the non-Patent Literature 19. (B) of FIG. 1 is a photo of Baby-9. It is seen that image of robot is reflected in a mirror placed at the backward of infant or baby.

1.1 Forty Three Seconds of an Infant's Day

In that study, there was found evidence that the infants in the experimental group treated the robot as if it were a social agent. For example, infants in the experimental group exhibited 5 times more vocalizations than infants in the control group. Moreover, they followed the "line of regard" of the robot when it rotated, showing some evidence for shared attention (e.g. see non-Patent Literature 15). We were particularly surprised however by the intensity of the interactions that occurred between some infants and the robot, by the clear intending property of the infant's actions, an by the speed with which these interactions developed.

Infants appeared to actively "decide" in a few trials, and a matter of seconds irrespective of whether or not the robot was responsive and then behaved accordingly. Particularly telling were the first 43 seconds with one of the infants in the experimental group. We will refer to him as "Baby-9" (see FIG. 1(B)). He was 10 months old on Jul. 14, 1986, when the study was run at UC Berkeley's Institute for Human Development. The video of these 43 seconds is available at http://mpla-b.used.edu. During the 43 seconds, the Baby-9 produced 7 vocalizations, each of which was followed by a combination of sounds and lights from the robot. Most people that see this video agree that by the third or fourth vocalization (25 seconds into the experiment) Baby-9 has clearly detected the fact that the robot was responsive to him. Most importantly, while watching the video, it is quite obvious that the child is actively querying the robot and testing whether or not it is responding to him. This brings about some interesting questions that will be the focus of this paper:

1) What does it mean to "ask questions" for an organism that does not have language?
2) Was it smart for Baby-9 to schedule his vocalizations in the way he did? For example, why did he not vocalize, for example, at a much rapid or a much slower rate?
3) Was it smart for Baby-9 to decide within three to four responses and 20-30 seconds into the experiment that the robot was responsive? Why not more or less time and responses?

The Infomax control problem have appeared frequently in the perception/categorized literatures in recent years, but Infomax that these literatures ordinarily use greedy one-step forward Infomax, rather than optimal strategy.

The main actual limitation of the current system originates from simplification of model of current social agent. Particularly, the current system describes agent as passive reactor, but does not describe him as independent proposer of behavior having willing of communication. Extension of the model for processing this model is not complicated. However, it is better to expense time for learning such model from data, rather than manually preparing improved model with respect to social agent.

In addition to scheduling own reaction by optimal method, Baby-9 gradually enhanced tone of the reaction and quality of feeling over the entirety of simulated 43 seconds. Such tone is linked with change of belief relating to existence of social agent to thereby have ability to model this representation. Such modification is effective for improvement of interaction between robot model and the human being, but is not produced from current model by a method based on the principle, e.g., alternative method.

The Baby-9 was behaved in accordance with optimal method in connection with learning as to whether or not novel social agent reacts, but a greater part of infants participating in the experiment does not behave in this manner. The subjective feeling obtained when looking at these infants is that the infants fear of situations in the beginning.

There is proposed a typical approach for organization of behaviors is made on the basis of the idea to schedule behavior by a method in which organism is moved by the target to optimize collection of information relating to the target. The traditional/instrumental learning model emphasizes role of external stimulation as enhancement factor of behavior (foods, water, disagreement of feeling, breath, light electric shock are most typical), whereas stimulation and/or reaction have not internal value in the Infomax control. On the assumption of the current knowledge state of the organism instead, its value relates to expectation information return. The Infomax can be considered as a control of the own management form in which the organism itself assigns enhancement value to stimulation and reaction by the dynamic method. The external enhancement factor is not necessary. In order to bring about behavior expected to explain obtainable data in a more well-manner instead to provide data of high information value, the Infomax controller modifies its internal state.

In the search of the social contingency in 10-month infant, we exemplified how the idea of the Infomax controller can be used in order to understand simple reaction. Interestingly, in this situation, the optimal Infomax controller indicates alternative behavior similar seen in the infant at an age corresponding thereto. Namely, the controller indicated reaction, and silent period is continued thereafter as if issuing of question is anticipated. This "alternative" behavior was not incorporated in the system. On the assumption of typical time delay and level of uncertainty in the social interaction, its behavior was rather caused from the demand of maximizing information obtained. Those results suggested that infants at corresponding age already made question in spite of the fact that language is lacked. Namely, on the assumption of the time delay and uncertainty level which are typical to the social interaction, infants schedule their behaviors by a method of maximizing expectation information return. This is the fact that parents intuitively know but it is difficult to formally verify.

The approach presented here well functions in fact also in the case where it is applied to robot which has to be operated on the real time basis in situations of usual living life. This not only brigs about reliability with respect to the idea in which contingency is profit and it is information source inexpensive from a viewpoint of calculation, but also gives the reliability with respect to the idea in which there is high possibility that brain of the infant defines co-specific to use contingency for search.

Since an Infomax control has mathematical basis in connection with the probability and the control theory, it can be extended to other regions on the basis of the principle. For example, current analysis may be extended to rat and/or neuron, and may be extended as far as molecule. The Infomax model of current nervous activity gives role to neuron as passive information relay, i.e., the role of nervous activity is to transmit information as many as possible in connection with information received. The Infomax control provides framework for verifying intersecting possibility in which neuron may "make a question", i.e., its spike is designed not only for merely transmitting information to other neuron, but also for gathering information relating to other neurons. Of course, feedback linkage can be considered as a chance for obtaining answer with respect to question.

The inventor, et. al of this Application exemplified typical approach to the study of behavior which has been detonated by Devit Man who is precursor of computational nervous science.

[Non-Patent Literature 1] R. C. Arkin. Behavior-based Robotics. MIT Press, Cambridge, Mass., 1998.

[Non-Patent Literature 2] T. Bell and T. Sejnowski. An information-maximization approach to blindseparation and blind deconvolution. Neural Computation, 7:1129-1159, 1995.

[Non-Patent Literature 3] C. Breazeal. Designing Sociable Robots. MIT Press, Cambridge, Mass., 2002.28

[Non-Patent Literature 4] Reichle E. D., Rayner K., and A. Pollatsek. The E-Z reader model of eyemovement control in reading: comparisons to other models. Behavioral and Brain Sciences, 26:445-526, 2003.

[Non-Patent Literature 5] Todorov E. and Jordan J. I. Optimal feedback control as a theory of motor coordination. Nature Neuroscience, 5:1226-1235, 2002.

[Non-Patent Literature 6] S. Edleman and L. M. Vaina. David marr. International Encyclopedia of the Social and Behavioral Sciences, 2001.

[Non-Patent Literature 7] Tanaka H., Krakauer W., and Qian N. An optimization principle for determining movement duration. Under Review, 5, 2005.

[Non-Patent Literature 8] Denzler J. and Brown C. M. Information theoretic sensor data selection for active object recognition and state estimation. Transactions on Pattern Analysis and Machine Intelligence, 24:145-157, 2002.

[Non-Patent Literature 9] Najemnik J. and Geisler W. S. Optimal eye movement strategies in visual search. Nature, 434, 2005.

[Non-Patent Literature 10] Renninger L. and Coughlan J., P. Verghese, and J. Malik. An information maximization model of eye movements. In S. A. Solla, T. K. Leen, and K. R. Miller, editors, Advances in Neural Information Processing Systems, volume 17, pages 1121-1128. MIT Press, 2005.

[Non-Patent Literature 11] M. S. Lewicki. E_cient coding of natural sounds. Nature Neurosci, 5(4): 356-363, 2002.

[Non-Patent Literature 12] R. Linsker. Self-organization in a perceptual network. Computer, 21: 105-117, 1988.

[Non-Patent Literature 13] Harris C. M. and Wolpert D. M. Signal dependent noise determines motor planning. Nature, 394:780-784, 1998.

[Non-Patent Literature 14] David Man. Vision. Freeman, New York, 1982.

[Non-Patent Literature 15] J. R. Movellan and J. S. Watson. The development of gaze following as a Bayesian sysgems identification problem. In Proceedings of the International Conference on Development and Leaning (ICDL02). IEEE, 2002.

[Non-Patent Literature 16] J. D. Nelson and J. R. Movellan. Active inference in concept induction. In T. Leen, T. G. Dietterich, and V. Tresp, editors, Advances in Neural Information Processing Systems, number 13, pages 45-51. MIT Press, Cambridge, Mass., 2001.

[Non-Patent Literature 17] J. D. Nelson, J. B. Tenenbaum, and J. R. Movellan. Active inference in concept learning. In Proceedings of the 23rd Annual Conference of the Cognitive Science Society, pages 692-697. LEA, Edinburgh, Scotland, 2001.

[Non-Patent Literature 18] Jonathan Nelson, Gary Cottrell, and Javier R. Movellan. Explaining eye movement during learning as an active sampling process. In Proceedings of the second international conference on development and learning (ICDL04), The Salk Institute, San Diego, Oct. 20, 2004.

[Non-Patent Literature 19] Movellan J. R. and J. S. Watson. Perception of directional attention. In Infant Behavior and Development: Abstracts of the 6th International Conference on Infant Studies, NJ, 1987. Ablex.

[Non-Patent Literature 20] R. P. N. Rao, B. A. Olshausen, and M. S. Lewicki. Probabilistic Models

SUMMARY OF THE INVENTION

The inventor et. al of this Application have linked the problems of the real time learning and the real time social interaction to search the theory for stochastic optimal control as representation form for understanding active real time learning in order to synthetically explain it. The term of "real time" is used for emphasizing time pressure with respect to behavior appearing during learning. The term of "active" points out the fact that behavior of the learning agent has the object, i.e., the fact that in the case where consideration is made as a solution method with respect to the optimization problem, its validity becomes clear.

The control theory includes reinforcement learning as underlying field, and is traditionally applied to optimization of social object (e.g., chase of moving object, maintaining of balance of pole, maintaining of velocity under changing load). From this viewpoint, it is considered that the learning is process for developing controller by trial-and-error. In this paper, the inventor employs another viewpoint to search learning process itself as control problem. In order to emphasize the direct relationship with respect to the Infomax model of perception, this idea is called Infomax control (e.g., see non-Patent Literatures 2, 11, 12, 20).

This is natural application of the control theory (i.e., "leaning is caused to be the goal of controller"), and brings about, at the same rime, the viewpoint in which its ability is not yet sufficiently pointed out in the literatures.

Use of the term of "reinforcement leaning" has brought about unfortunate result in which some people are caused to believe that reinforcement factor should be target event (e.g., win at game of backgammon, prevention of crash of helicopter, acquisition of foods, avoidance of electric shock). Instead, "reinforcement" signal used in the infomax is related to the subjective belief. It is unnecessary to explicitly transmit, to the learning agent, whether it is correct or wrong, and "reinforcement" is instead own ability of agent which builds up strong belief. This is typical characteristic of the fact-Bayesian approach, and this approach can be modified into subjective interpretation. In this approach, basis of updating of belief relating to category constraint of the probability theory is taught to thereby avoid the solipsism. At present, it is generally trend to discriminate between the control theory and the reinforcement learning by the fact that the control theory demands the model of the world, but the reinforcement learning does not demand the model of the world. However, in the Bayesian approach, such discrimination is not clear. Of course, Bayesian tradition is established on the basis of the assertion that the meaning in which model is lacked has vague advance belief with respect to the fact that there merely exists distinction between model having persuasive power and model having no persuasive power. In short, Bayesian approach has the model with respect to "lacking of model". Thus, the Bayesian approach controls peculiar own management character.

It is desirable to use Infomax control in order to understand development of simple real time social interaction. "Real time social interaction" means rapid exchange of behavior signal under time pressure in the fact-to-face social environment. The communication channel in this event has feedback delay of one several minutes to several seconds. From the fact that the social agent is independent so that prediction is difficult, level of uncertainty relating to result of behavior and uncertainty relating to timing of such result are important.

From this fact, the area of an embodiment of the present invention differs from the area of traditional motor control in which delay is measured in units of 1 (one) second of 10 (ten) minutes and uncertainty can be negligible, or the area of interaction of other form having long feedback delay and negligible time constraint (e.g., physical character or communication through electronic male). It is to be noted that detail of the area of the social interaction may differ from the case of the traditional motor control, but the mathematical form which forms its basis may be the same.

The idea of the present invention was derived from the study for understanding surprising behavior of 10-month infant in the experiment that the inventor et. al of this Application has conducted at UC Barkley School in 1985.

The object of the experiment was to understand how children learn causal structure of social agent. To this effect, children react with robot. There were instances where they may react with the robot, and there were instances where they may not react with the robot. Children to whom the inventor has drawn attention in this paper embodied several characteristics that the inventor considers to be inevitable for understanding the human behavior, but these characteristics were overlooked by the learning model at that time.

(1) Children learned that they suitably react with robot much earlier than our expectation.

(2) Irrespective of the fact that robot indicates reaction or not, children were clearly active as if they make a question by non-language method. At that time, the inventor has not representation form for understanding this learning behavior. In the linkage approach as in the case of back propagation, speed was too slow and was only passive. The traditional AI approach did not handle uncertainty of the problem and the real time constraint.

Interest of the inventor et. al of this Application relating to the control theory was arisen during study relating to development of robot designed to interact with people. Such robots were directly faced to the specific problem relating to timing and dynamic processing of uncertainty which is typical in interaction with the bio-system. The inventor, et. al of this Application has convinced that the theory of the stochastic optimal control is the ideal representation for processing these problems, and have been aware in that process that such theory is excellent explanation with respect to the behavior that John Watoson and the inventor have yet observed in 1985.

The inventor et. al of this Application has announced the idea of the Infomax control in relation to development of social interaction. This approach is universal, and can be potentially applied to very widely various problems. Particularly interestingly, this idea is the fact that definition of formula which can be universally applied to non-language organism is given to what is "question".

Still further objects of the present invention will become more apparent from the explanation of the embodiment which will be given below.

An interaction device according to an embodiment of the present invention sets own controller in order to maximize expectation of information defined between a hypothesis about an interaction object and own input/output.

Moreover, the interaction device according to an embodiment of the present invention includes control means for performing action or behavior output on the basis of input/output information at a timing where expectation acquisition information quantity for existence of this side is maximum with respect to an interaction object.

In the present invention, extraction of the concept of contingency in the developmental psychology is implemented within the framework of the Bayesian estimation. Thus, the degree of conviction with respect to hypothesis as to whether human being of interaction object is present or absent robot can be momentarily obtained in the form of probability value. By using only simple input/output sensor, it is possible to realize a robot apparatus capable of determining whether the human being is present or not.

Moreover, in the present invention, response characteristic momentarily changes through exchange of interaction, and dynamics thereof indicate them close to dynamics of the human being. Thus, more natural response characteristic is indicated. Particularly, validity is exhibited in application scenes of long-term interaction.

BRIEF DESCRIPTION OF THE DRAWINGS

FIGS. 5(A), (B) are views of two contingency clusters prepared by model.

FIG. 7(A) is a view showing reaction of Infomax controller which simulates infant, FIG. 7(B) is a view showing posterior probability in the case where agent reacting as a function of time exists, FIG. 7(C) is a view showing posterior distribution of agent velocity after 43 seconds and background velocity, and FIG. 7(D) is a view showing ratio between uncertainty about responsive velocity of agent and uncertainty about responsive velocity of background.

DESCRIPTION OF THE PREFERRED EMBODIMENTS

Figure 1B:
FIG. 1(B) is a photo of Baby-9, wherein it is seen that image of robot is reflected in mirror placed behind infant.
Figure 1A:
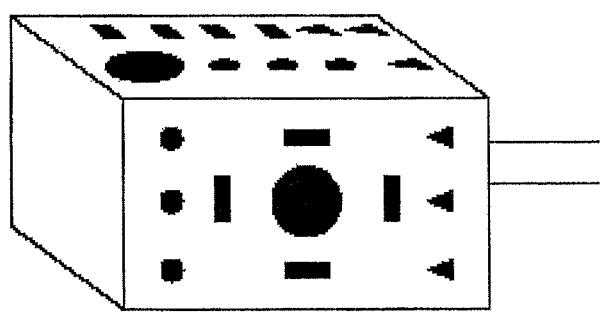
FIG. 1(A) is a schematic view of head portion of robot used in non-Patent Literature 19.

Preferred embodiments of the present invention will now be described in detail with reference to the attached drawings. It is a matter of course that the present invention is not limited to the following embodiments, and may be arbitrarily changed or modified within the range which does not depart from the gist of the present invention.

2 TOWARDS AN ARCHITECTURE FOR SOCIAL ROBOTS

Unless otherwise stated, capital letters are used for random variables, small letters for specific values taken by random variables, and Green letters for fixed parameters. The properties of the probability space $(\Omega, F, P)$ in which the random variables are defined is left implicit. When the context makes it clear, probability functions is identified by their arguments: e.g., $p(x, y)$ is shorthand for the joint probability mass or joint probability density that the random variable $X$ takes the specific value $x$ and the random variable $Y$ takes the value $y$. We use subscripted colons to indicate sequences: e.g., $X_{1:t} \stackrel{def}{=} \{X1 \ldots Xf\}$. Working is performed with discrete time stochastic processes. The parameter $\Delta t \in R$ will represent the sampling period, i.e., the time between time steps, in seconds. Choosing a specific value of $\Delta t$ is equivalent to assuming that the relevant information about an underlying continuous time process is in frequency bands lower than $0.5/\Delta t$ Hertzs. The symbol $\sim$ indicates the distribution of random variables. For example, $X \sim Poission(\lambda)$ indicates that $X$ has a Poisson distribution with parameter $\lambda$. The notation $Y \in \sigma\{X\}$ means that the random variable $Y$ is measurable by the sigma-algebra induced by the random variable $X$. Intuitively, this means that $X$ contains all the information needed to determine the value of $Y$. E is used for expected value, and Var is used for covariance matrix. $\delta(\cdot,\cdot)$ is used for the Kronecker delta function, which takes value 1 if its two arguments are equal, otherwise it takes value 0. $N = \{0, 1, 2, \ldots\}$ represents the natural numbers, and R is the real numbers. [25] Let a robot architecture be mappings between two stochastic process: a sensory process $Y = \{Y_1, Y_2, \ldots\}$ and a motor process $U = \{U_1, U_2, \ldots\}$. At time t, the robot has access to the information in $Y_{1:t}$ and $U_{1:t-1}$ and has to produce a motor command based on such information, i.e. $U \in \sigma\{Y_{1:t}, U_{1:t-1}\}$. In practice, such mapping relies on functional recursive statistic value St that maintains the relevant information about the past history, i.e. relies upon $$\sigma\{S_t\} = \sigma\{S_{t-1}, u_{t-1}, Y_t\} \text{ for } t=1, 2, \ldots, \quad (1)$$

$$U_t \in \sigma\{S_t\} \quad (2)$$

In deliberative architectures, St would be called a representation of the world and a great deal of the available resources is assigned to maintaining such representation of the world. Reactive architectures emphasize the idea that the word is constantly changing and thus history of little interest. In its most pure form, they make $$S_t = Y_t \text{ for } t=1, 2, \ldots, \quad (3)$$

Here, the above-mentioned problem is investigated from the point of view of a bare-bores robot endowed with a single binary sensor (e.g., a sound detector) and a single binary actuator. There will be two players, i.e., (1) A social agent, which plays the role of the caregiver, and (2) A robot, which plays the role of the infant. Agent and robot are in an environment which may have random background activity. The role of the robot is to discover as soon as possible and as accurately as possible the presence of responsive social agents.

Figure 2:
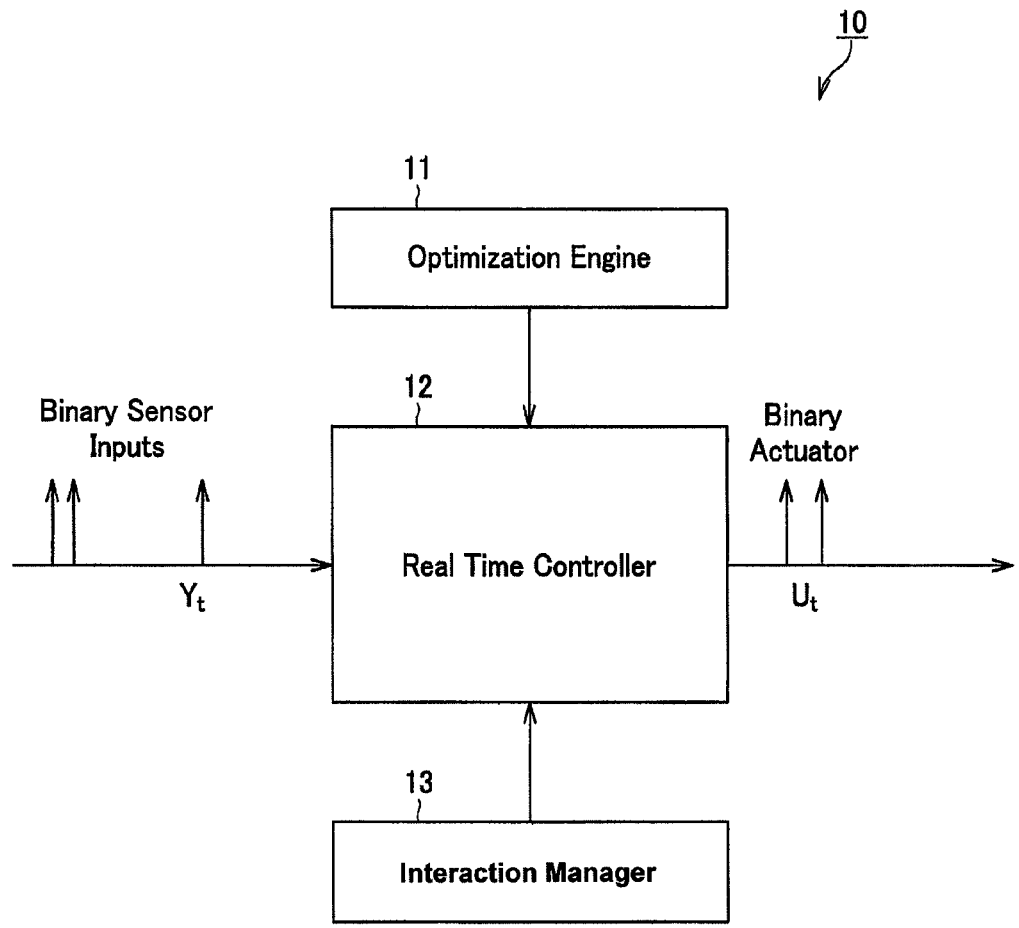
FIG. 2 is a view showing the configuration of social robot having only function necessary as minimum as possible.

Here, as shown in FIG. 2, for example, a social robot 10 having the necessary minimum function, which generates binary actuator output $U_t$ in accordance with binary sensor input $Y_t$, an optimal engine 11, a real time controller 12 and an interaction manager 13. [27] Activity of actuator of robot is represented by binary random process $\{U_t\}$. The value of the variable $U_t$ is 1, when actuator of robot is operative, and is 0 (zero) when otherwise. The presence or absence of responsive social agents is indicated by the random variable H. We refer to {H=0}, the absence of a responsive agent, as the "null hypothesis", and {H=1}, i.e., the presence of a responsive agent, as "alternative hypothesis". The parameter π represents the prior probability of the alternative hypothesis, i.e., the robot's initial belief about the presence of a social agent, prior to the gathering of sensory information.

2.1 Modeling Social Agents

While exceedingly simplistic, the model described below has the advantage of being mathematically tractable and maintaining two essential properties of interest: (1) Different agents have different levels of responsiveness, and (2) Social agents respond with signal delays and levels of uncertainty in these delays. This model of social agency is rich enough to explain how the idea of stochastic optimal control could be used to frame the problem of real time social interaction.

Let suppose the behavior of the social agent depend on two auxiliary processes: A timer $\{Z_t\}$ and an indicator $\{I_t\}$. The timer enables to model the time delays and temporal uncertainties typical of social interaction. It takes value in $\{0, \ldots, \tau_2^a\}$ where $\tau_2^a \in \mathbb{N}$ is a parameter of the model, whose meaning will be explained below. The timer keeps track, up to $\tau_2^a$, of the number of time steps since the last robot section (see FIG. 3), i.e., $$Z_t \stackrel{def}{=} \begin{cases} \tau_2^a + 1 & \text{if } t = 1 \text{ and } U_t = 0 \\ 0 & \text{if } t \geq 1 \text{ and } U_t = 1 \\ Z_{t-1} & \text{if } t > 1 \text{ and } U_t = 0 \text{ and } Z_{t-1} > \tau_2^a \\ 1 + Z_{t-1} & \text{else} \end{cases} \quad (5)$$

The indicator vector $It = \{I_{1,t}, I_{2,t}, I_{3,t}\}^T$ is composed of three binary variables that indicates whether or not time t belongs to the following categories: (1) "Self Period", indicated by $I_{1,t}$; (2) "Agent Period", indicated by $I_{2,t}$, and (3) "Background period", indicated by $I_{3,t}$. The meaning of these three periods is explained below.

The reaction times of social agents is bounded by the parameters $0 \leq \tau_1^a \leq \tau_2^a$, i.e., it takes agents anything from $\tau_1^a$ to $\tau_2^a$ time steps to respond to an action from the robot. "Agent periods", which are designated by the indicator process $\{I_{2,t}\}$ are periods of time for which responses of agents to previous robot actions are possible if an agent were to be present. Thus, $$I_{2,t} = \begin{cases} 1 & \text{if } Z_t \in [\tau_1^a, \tau_2^a] \\ 0 & \text{else,} \end{cases} \quad (6)$$

During agent periods, the robot's sensor is driven by the Poisson's process $\{D_{2,t}\}$ which has rate $R_2$. The distribution of $R_2$ depends on whether or not a responsive agent is present in a manner that will be specified below.

Figure 3:
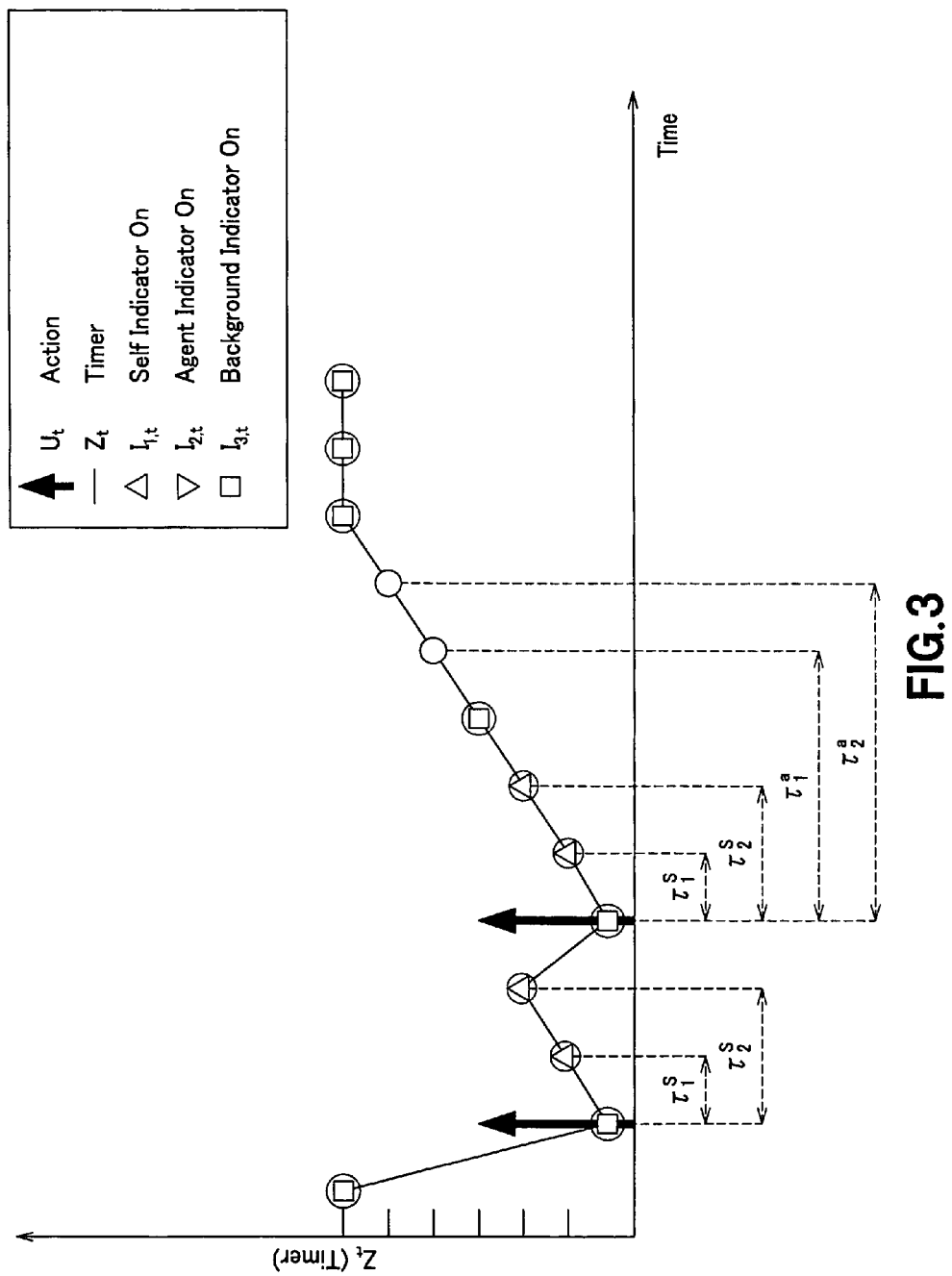
FIG. 3 is a graphic representation of dynamics of timer and indicator variable.

Here, FIG. 3 is a graphic representation of dynamics of timer and indicator variable. Delay parameters were indicated as $\tau_1^s = 1, \tau_2^s = 2, \tau_1^a = 4, \tau_2^a = 5$.

2.2 Modeling Self-Feedback and Background Processes

Consideration is taken into the robot sensor to respond to the robot actuator, e.g., the robot can hear its own vocalizations, and delays and uncertainty in this self-feedback loop. In particular, it is assumed that the distribution of self-feedback reaction time be uniform with parameters $\tau 1^s \leq \tau 2^s$, where $\tau 2^s < \tau 1^a$. The indicator variable for self-feedback period is thus defined as follows:

$$I_{1,t} = \begin{cases} 1 & \text{if } Z_t \in [\tau_1^s, \tau_2^s] \\ 0 & \text{else} \end{cases} \quad (7)$$

During self periods, the activation of the sensor is driven by the Poisson's process $\{D_{1,t}\}$ with rate $R_1$.

With regard to the background process, it is modeled as a Poisson's process $\{D_{3,t}\}$ with rate $R_3$. The background process drives the sensor's activity that is not due to self-feedback and is not due to social agent responses to the robot's behaviors. Note that the background process can include the actions particularly from external social agents who are not responding to the robot (e.g., two social agents may be talking to each other thus activating the robot's sound sensor). Prior Beta distribution with parameters $\beta_{3,1}, \beta_{3,2}$ reflecting the variability of background activity corresponding to situation is given to the background speed $R_3$. If $\beta_{3,1} = \beta_{3,2} = 1$, the distribution is uninformative reflecting that all responsiveness rate are equally possible a priori $$R_3 \sim \text{Beta}(\beta_{3,1}, \beta_{3,2}) \quad (8)$$

Thus, the distribution has no information value.

The background indicator keeps track of periods for which self-feedback or responsive actions from a social agent may not happen, i.e., is represented as below.

$$I_{3,t} = (1 - I_{1,t})(1 - I_{2,t}) \quad (9)$$

2.3 Modeling the Robot's Sensor

The activity of the sensor is a switched Poisson's process: during self-feedback periods, it is driven by the Poisson's process $\{D_{1,t}\}$, during agent period, it is driven by $\{D_{2,t}\}$ and during background periods it is driven by $\{D_{3,t}\}$, i.e., and is represented as below.

$$Y_t = I_t \cdot D_t = \sum_{i=1}^{3} I_{i,t} D_{i,t} \quad (10)$$

Further, there is a necessity to specify the distribution of the response rate $R_2$ during agent periods. If an agent is present, i.e., H=1, R2 is caused be independent of $R_1$ and $R_3$ and an prior Beta distribution is endowed with respect parameters $\beta_{2,1}, \beta_{2,2}$ reflecting the variability in response rates typical of social agents. If $\beta_2, 1 = \beta_2, 2 = 1$, the prior distribution is uninformative (blank state approach). If an agent is not present, i.e., H=0, then the response rate during agent periods is not different from the response rate during background periods, i.e., $R_2 = R_3$. In the inventor's view, it is necessary to say that it will be beta with parameters beta 11 beta 12 but that these parameters have no effect on the behavior of the model so designation of parameters is not performed.

2.4 Auxiliary Processes

The processes $\{O_t, O_t\}$ is used in order to register the sensor activity and lack thereof up to time t during self, agent and background periods. In particular for t=1, 2 . . .

$$O_{i,t} = \sum_{s=1}^{t} I_{i,t} Y_t, \text{ for } i = 1, 2, 3 \quad (11)$$

$$Q_{i,t} = \sum_{s=1}^{t} I_{i,t} (1 - Y_t), \text{ for } i = 1, 2, 3. \quad (12)$$

2.5 Stochastic Constraints

Appendix 1 contains a summary of the parameters, random variables, and stochastic processes which specify the model.

Figure 4:
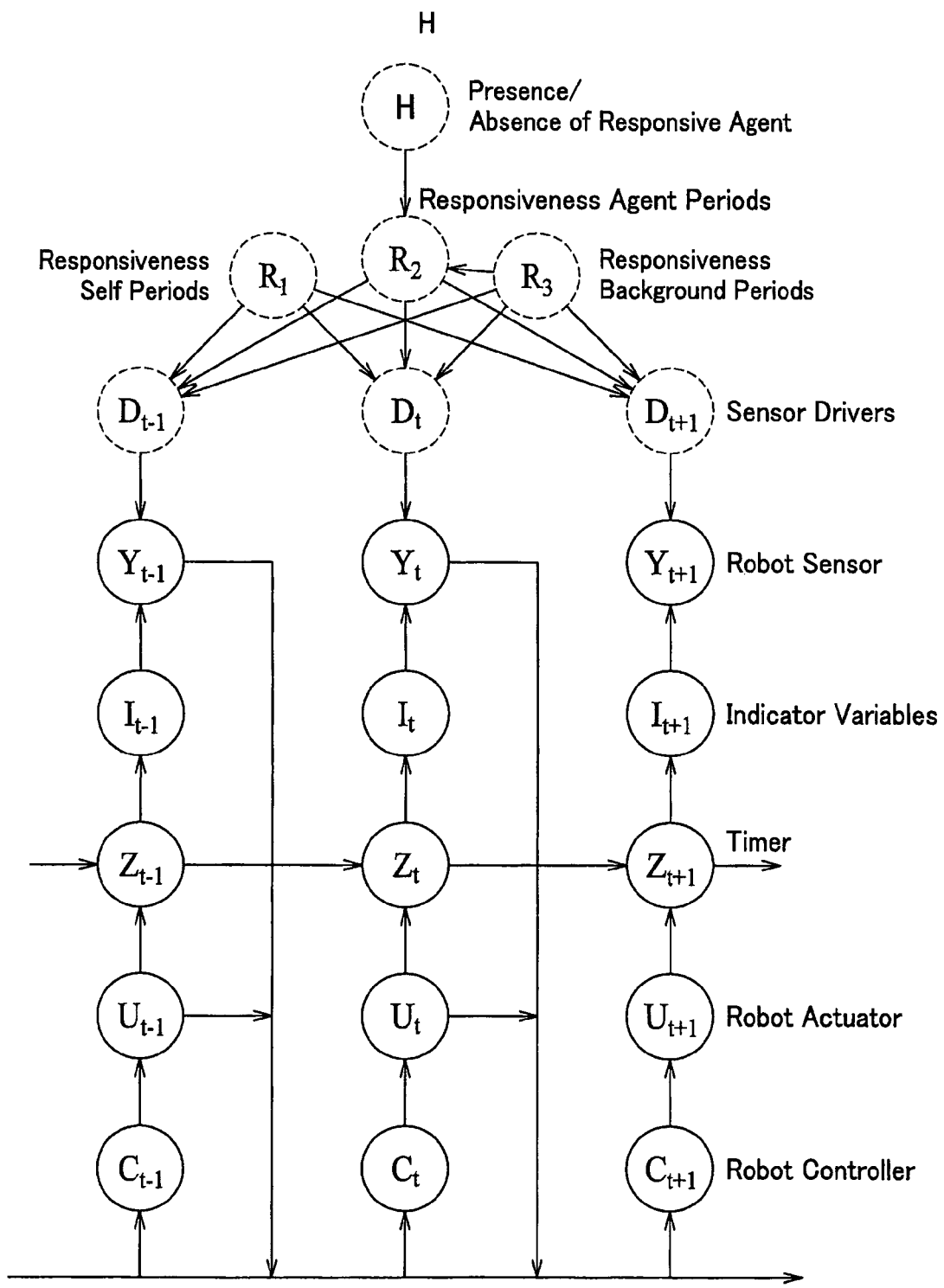
FIG. 4 is a graphic representation of generation model.

FIG. 4 shows Macrkovian constraints in the joint distribution of the different variables involved in the model. An arrow from variable X to variable Y indicates that X is "parent" of Y. The probability of a random variable is conditionally independent of all the other variable given the parent variables. Dotted figures indicate unobservable variables, and solid line portions indicate observable variables.

Here, in the generation model shown in FIG. 4, the controller $C_{t+1}$ maps all observable information with respect to action $U_{t+1}$ until t. The effect of the action depends on presence or absence of agent H and timing determined by $Z_t$. The infomax controller maximizes hidden variable of interest, e.g., information return about the value of H.

3 DEVELOPMENT AND LEARNING INFERENCE, AND CONTROL

Here, "development" is to say the problem of discovering the causal structures existing at the underlying social interaction, i.e., discovering a model of the kind shown in FIG. 4. This is a difficult problem which may demand large amounts of data gathered over months or years. Here "learning" refers to the problem of discovering contingencies, i.e., the problem of making inference about unobservable variables of a given model. This is a process that in general demands less data than model development and may occur within sounds, minutes or hours.

Development and learning rely on two basic processes: inference and control. Inference refers to the problem of combining prior information with sensor data in a principled manner. Control refers to the problem of scheduling behavior in real time to optimize the achievement of goals of organism.

3.1 Development

In practice, the model we have developed so far simply says that, when interacting with the world, the robot may encounter two "causal clusters" (See (A), (B) of FIG. 5):

Here, (A), (B) of FIG. 5 is a view showing two contingency event clusters prepared by the Model. The variable H shows which of two variables is being operated in the present situation. (A) of FIG. 5 shows contingency event cluster 1 "reactive agent absent", and (B) of FIG. 5 shows contingency event cluster 2 "reactive agent present".

In the [cluster 1], the case where sensor action changes in regard to background action in the period $[\tau_1^s, \tau_2^s]$ continuous to a certain action. This is based on the effect of self-feedback.

In the case where there is the tendency such that sensor action changes in $[\tau_1^s, \tau_2^s]$ in the [cluster 2], but is changed also for a period continuous to a certain action $[\tau_1^a, \tau_2^a]$, second change of the action depends on existence of responsive social agent.

Very leading architecture in the social robot engineering conveniently depends upon the theoretical approach of mind from the developmental physiology (e.g., see non-Patent Literatures 3, 22). The fact that these approaches emphasize is the idea that the infant naturally has knowledge module of high level for dealing with the human being or significant agent. On the other hand, the robot architecture proposed here does not explicit level or conceptual theory.

While the causal model is manually developed in the above-mentioned explanation, current mechanical learning method may be used for the purpose of discovering these causal clusters. As the theoretical approach of the mind states, these clusters may not correspond to all concepts which can be easily described by the word. It is sufficient for us to only actually feel that the robot discovers existence of causal cluster of the above-mentioned type so that such cluster is useful when behaving within the world.

3.2 Learning: Inference

In this section, it is assumed the robot has already developed a causal model and focus on how to make inferences about the presence or absence of a social agent based on a given sequence of sensor activities y1:t and actions u1:t. Let $(y_{1:t}, u_{1:t}, o_t, q_t, z_t)$ be an arbitrary sample from $(Y_{1:t}, U_{1:t}, O_t, Q_t, Z_t)$. Then $$p(y_{1:t} | r, u_{1:t}, h) = \prod_{i=1}^{3} (r_i)^{o_{i,t}} (1 - r_i)^{q_{i,t}} \quad (13)$$

Note the rate variables $R_1, R_2, R_3$ are independent under the prior distribution. Moreover if H=1 they affect the sensor at non intersecting sets of time. It follows that the rate variables are also independent under the posterior distribution. In particular $$p(r | y_{1:t}, u_{1:t}, H = 1) = \prod_{i=1}^{3} \text{Beta}(r_i; \beta_{i,1} + o_{i,t}, \beta_{i,2} + q_{i,t}) \quad (14)$$

Under the null hypothesis $R_2 = R_3$, i.e., the sensor activity does not change during the "agent periods". Moreover the set of times for which the sensor's activity depends on $R_2, R_3$ does not intersect with the set of times for which it depends on R1. Thus $R_1$ will be independent of $R_2, R_3$ under the posterior distribution:

$$p(r|y_{1:t}, u_{1:t}, H=0) = \text{Beta}(r_1; \beta_{1,1}+o_{1,t}, 1+q_{1,t}) \text{Beta}(r_2; \beta_{2,1}+o_{2,t}+o_{3,t}, \beta_{2,2}+q_{1,t}+q_{3,t}) \delta(r_2, r_3) \quad (15)$$

Note for an arbitrary r such that $p(r|y_{1:t}, u_{1:t}, h) > 0$ we have that $$p(y_{1:t} | u_{1:t}, h) = p(y_{1:t} | r, u_{o:t}, h) \frac{p(r | u_{1:t}, h)}{p(r | y_{1:t}, u_{1:t}, h)} \quad (16)$$

Thus, something not right on transition from 17 to 18. In the equation (17), ignoring the u( ), we get a ratio of q even if o+q=0. In the equation (18) we don't.

$$p(y_{i:t} | u_{1:t}, H = 1) = \prod_{i=1}^{3} (r_i)^{o_{i,t}} (1 - r_i)^{q_{i,t}} \left( \frac{\text{Beta}(r_i; \beta_{i,1}, \beta_{i,2})}{\text{Beta}\left(\begin{array}{c} r_i; \beta_{i,1} + o_{i,t}, \\ \beta_{i,2} + q_{i,t} \end{array}\right)} \right) \quad (17)$$

$$= \prod_{i=1}^{3} \frac{\Gamma(\beta_{i,1} + \beta_{i,2})}{\Gamma(\beta_{i,1})\Gamma(\beta_{i,2})} \frac{\Gamma(\beta_{i,1} + o_{i,t})\Gamma(\beta_{i,2} + q_{i,t})}{\Gamma(\beta_{i,1} + \beta_{i,2} + o_{i,t} + q_{i,t})} \quad (18)$$

$$p(y_{1:t} | u_{1:t}, H = 0) = \frac{\text{Beta}(r_1; \beta_{1,1}, \beta_{1,2})}{\text{Beta}(r_1; \beta_{1,1} + o_{1,t}, \beta_{1,2} + q_{1,t})} \frac{\text{Beta}(r_2; \beta_{2,1}, \beta_{2,2})}{\text{Beta}(r_2; \beta_{2,1} + o_{2,t}, o_{3,t}, \beta_{2,2} + q_{2,t} + q_{3,t})} \quad (19)$$

$$\prod_{i=1}^{3} (r_i)^{o_{i,t}} (1 - r_i)^{q_{i,t}} \quad (20)$$

-continued $$\frac{\Gamma(\beta_{1,1}+\beta_{1,2})\Gamma(\beta_{1,1}+o_{1,t})\Gamma(\beta_{1,2}+q_{1,t})}{\Gamma(\beta_{2,1}+\beta_{2,2})\Gamma(\beta_{2,1}+o_{2,t}+o_{3,t})\Gamma(\beta_{2,2}+q_{2,t}+q_{3,t})} = \frac{\Gamma(\beta_{1,1})\Gamma(\beta_{1,2})\Gamma(\beta_{1,1}+\beta_{1,2}+o_{1,t}+q_{1,t})}{\Gamma(\beta_{2,1})\Gamma(\beta_{2,2})\Gamma(\beta_{2,1}+\beta_{2,2}+o_{1,t}+o_{2,t}+q_{2,t}+q_{3,t})} \quad (21)$$

where we used the fact that $R_2 = R_3$ with probability one under $H=0$. Thus the log-likelihood ratio between the two hypotheses is as follows:

$$\log\frac{p(y_{1:t} \mid u_{1:t}, H=1)}{p(y_{1:t} \mid u_{1:t}, H=0)} = \quad (22)$$

$$\log\frac{\Gamma(\beta_{3,1}+\beta_{3,2})}{\Gamma(\beta_{3,1})\Gamma(\beta_{3,2})} + \log\frac{(\beta_{2,1}+\beta_{2,2}+o_{2,t}+o_{3,t}+q_{2,t}+q_{3,t})}{(\beta_{2,1}+o_{2,t}+o_{3,t})\Gamma(\beta_{2,2}+q_{2,t}+q_{3,t})} +$$

$$\sum_{i=2}^{3}\log\frac{\Gamma(\beta_{i,1}+o_{i,t})\Gamma(\beta_{i,2}+q_{i,t})}{\Gamma(\beta_{i,1}+\beta_{i,2}+o_{i,t}+q_{i,t})} \stackrel{def}{=} f_t(o_{2,t}, o_{3,t}, q_{2,t}, q_{3,t}) \quad (23)$$

and the posterior distribution about the hypothesis of interest is as follows:

$$p(H=1 \mid y_{1:t}, u_{1:t}) = \text{logistic}\left(\log\frac{\pi}{1-\pi} + f_t(o_{2,t}o_{3,t}, q_{2,t}, q_{3,t})\right) \quad (24)$$

3.3 Cases of Interest

More explicit $$L = \frac{\Gamma(\beta_{3,1}+\beta_{3,2})}{\Gamma(\beta_{3,1})\Gamma(\beta_{3,2})} \frac{\Gamma(\beta_{2,1}+o_{2,t})\Gamma(\beta_{2,2}+q_{2,t})}{\Gamma(\beta_{2,1}+\beta_{2,2}+o_{2,t}+q_{2,t})} \quad (25)$$

$$\frac{\Gamma(\beta_{3,1}+o_{3,t})\Gamma(\beta_{3,2}+q_{3,t})}{\Gamma(\beta_{3,1}+\beta_{3,2}+o_{3,t}+q_{3,t})} \frac{\Gamma(\beta_{2,1}+\beta_{2,2}+o_{2,t}+o_{3,t}+q_{2,t}+q_{3,t})}{\Gamma(\beta_{2,1}+o_{2,t}+o_{3,t})\Gamma(\beta_{2,2}+q_{2,t}+q_{3,t})}.$$

This posterior distribution contains all the information available to the robot about the presence of a responsive agent. It has two important properties: (1) It does not depend on $o_{1,t}$, $q_{1,t}$, i.e., the self-periods are uninformative about the hypothesis, and (2) If $o_{1,t}+q_{1,t}=0$ or $o_{2,t}+q_{2,t}=0$ the long-likelihood ratio is 0. In other words, if no data has been gathered in either the agent or the background condition then we have gained no information about H. Thus, in order to gain information about H, the robot must use its actuator at least once and not use it at least once.

If no data has been gathered yet, the likelihood ratio is 1, i.e., the posterior ratio equals the prior ratio.

If no agent data has been gathered yet, the likelihood ratio is 1, regardless of how much background data has not been gathered yet and $\beta_2 = \beta_3$, the likelihood ratio is 1 regardless of how much agent data has been gathered.

If no background data has been gathered, but $\beta \neq \beta$ gathering agent data is informative, in particular $$L = \frac{\Gamma(\beta_{3,1}+\beta_{3,2})}{\Gamma(\beta_{3,1})\Gamma(\beta_{3,2})} \frac{\Gamma(\beta_{2,1})\Gamma(\beta_{2,2})}{\Gamma(\beta_{2,1}+\beta_{2,2})} \quad (26)$$

$$\frac{\Gamma(\beta_{3,1}+o_{3,t})\Gamma(\beta_{3,2}+q_{3,t})}{\Gamma(\beta_{3,1}+\beta_{3,2}+o_{3,t}+q_{3,t})} \frac{\Gamma(\beta_{2,1}+\beta_{2,2}+o_{3,t}+q_{3,t})}{\Gamma(\beta_{2,1}+o_{3,t})\Gamma(\beta_{2,2}+q_{3,t})}$$

Supposing the inventor gathers a background bit and it is +1. This value is equally hard to explain by the null and the alternative hypotheses so no info has been gained. Now suppose that we have no background data but gather one bit from agent time and it is +1. The null hypothesis has an easy time explaining the result, but the alternative does not. Thus, information has been gained. If the bit has been 0, the null would have an easier result explanation time than the alternative explaining the results. Information has been gained.

3.4 Learning: Infomax Control

In this section, we focus how to schedule the behavior of the robot's actuators in order to maximize the expected information return about the presence or absence of social agents. Let t represent the present time and T>t sometime into the future. Let $C=\{C_r:r=t+1,\ldots T\}$ represent a closed loop controller, i.e., a collection of functions that map sequences of observations into actions, i.e., $$U_r = C_r(Y_{1:r}, U_{1:r}), \text{ for } r=t+1, \ldots T \quad (27)$$

Note we treat the controller C a random object which is consistent with the Bayesian approach. The goal is to find a value taken by C conditioned on which the uncertainty about H is minimized.

In the present invention, there is provided a controller c such that when conditioning on C=c the future information return about H is maximized.

The information return expected when using the controller c is given by the mutual information between H and the observable variables that would be available at that time $$I(H, (Y_{t+1:r}, U_{t+1:r}) \mid y_{1:t}, u_{1:t}, c) = H(H \mid y_{1:t}, u_{1:t}) - H(H \mid y_{1:t}, u_{1:t}, Y_{t+1:r}, c) \quad (28)$$

where I stands for mutual information, H for entropy (see Appendix III), and we used the fact that H is conditionally independent of $U_{t+1:r}$ given $(Y_{t+1:r}, C)$. The equation tells us that the information about H provided by the observable processes Y, U equals the reduction of uncertainty about H afforded by those processes. Since the term $H(H \mid y_{1:t}, u_{1:t})$ does not depend on the controller, maximizing the information gain is equivalent to minimizing the future entropy of H. We will use this fact to develop an information based utility function: Let Wr be the uncertainty about H given the observables at time r (see Appendix III for definitions of conditional expectations)

$$W_r \stackrel{def}{=} E[\log p(H=1) \mid Y_{1:r}, C_{1:r}] \quad (29)$$

Accordingly, following equation is obtained.

$$H(H \mid y_{1:t}, u_{1:t}, Y_{t+1:r}, c) = -E[W_r \mid y_{1:t}, c_{t+1:r}] \quad (30)$$

Let the expected return for the observed sequence $y_{1:t}$, $u_{1:t}$ given a controller c be defined as follows:

$$V_t(y_{1:t}, u_{1:t} \mid c) \stackrel{def}{=} \sum_{r=t+1}^{T} \alpha_r E[W_r \mid y_{1:t}, u_{1:t}, c_{t+1:r}]. \quad (31)$$

where the $\alpha_r \geq 0$ are fixed numbers representing the relative value of information at different points in the future. Our goal is to find a controller, c, that maximizes the expected return $$\hat{c} \stackrel{def}{=} \arg\max_c V_t(y_{1:t}, u_{1:t} \mid c) \quad (32)$$

We define the optimal expected return for the sequence $(y_{1:t}, u_{1:t})$ as its expected return given an optimal controller $$V_t(y_{1:t}, u_{1:t}) \stackrel{def}{=} V_t(y_{1:t}, u_{1:t} \mid \hat{c}) \quad (33)$$

It is easy to show that the optimal controller and optimal expected return satisfy Bellman's optimality equation $$\hat{C}_t(y_{1:t}, u_{1:t}) = \underset{u_{t+1}}{\mathrm{argmax}} N_t(y_{1:t}, u_{1:t}, u_{t+1}) + F_t(y_{1:t}, u_{1:t}, u_{t+1}) \quad (34)$$

$$\hat{V}_t(y_{1:t}, u_{1:t}) = \underset{u_{t+1}}{\max} N_t(y_{1:t}, u_{1:t}, u_{t+1}) + F_t(y_{1:t}, u_{1:t}, u_{t+1}) \quad (35)$$

where $$N_t(y_{1:t}, u_{1:t}, u_{t+1}) \overset{def}{=} \underbrace{E[W_{t+1}|y_{1:t}, u_{1:t+1}]}_{\text{Next Step Expected Return}} \quad (36)$$

$$F_t(y_{1:t}, u_{1:t}, u_{t+1}) \overset{def}{=} \underbrace{E[V_{t+1}(y_{1:t}, Y_{1+t}, u_{1:t+1})|y_{1:t}, u_{1:t+1}]}_{\text{Optimal Future Expected Return}} \quad (37)$$

Exact solution of Bellman's equation is in general intractable for partially observable Markov processes. This is due to the fact that the number of possible sequences grows too fast as a function of time. Fortunately in our case the problem simplifies due to the existence of a recursive statistic $St \overset{def}{=}$ (Ot, Qt, Zt) that summarizes the observable sequences without any loss of information about H. This allows finding an optimal controller using a standard dynamic programming recursive algorithm (See Appendix II).

4 ANALYSIS OF THE OPTIMAL CONTROLLER

The dynamic programming problem was solved on a 24 2.5 Ghz PowerPC G5 CPUs. The computation time was in the order of 12 hours. The parameters of the model were set as follows: $T=40$, $\tau_1^s=0$; $\tau_t^s=0$; $\tau_1^a=1$; $\tau_2^a=3$; $\pi=0.5$ We then used logistic regression to model the behavior of the controller for times $15 \leq t \leq 25$, since these are times which are not too close to the beginning and end of the controller's window of interest, i.e., $t \in$ e.g., see non-Patent Literatures 1, 40. Surprisingly logistic regression model predicted the action of the optimal controller with 96.46% accuracy over all possible conditions. The final model was as follows:

$$\hat{u}_t = \begin{cases} 1 & \text{if } I_{3,t} = 1 \text{ and } \dfrac{\mathrm{Var}(R_3 \mid y_{1:t}, u_{1:t}, H_t = 1)}{o_{3,t} + q_{3,z} + 3} > \\ & 9\dfrac{\mathrm{Var}(R_2 \mid y_{1:t}, u_{1:t}, H_t = 1)}{o_{2,t} + q_{2,z} + 3} \\ 0 & \text{else.} \end{cases} \quad (38)$$

Interpretation: While the derivation of the optimal controller was somewhat arduous the final product ends up being a simple reactive system that can easily operate in real time. What the derivations provided was a guarantee that this simple controller is optimal for the task at hand. No other control policy is better under the model. Note that "greedy" one-step controllers (e.g., see non-Patent Literatures 16, 17) that ignore the future expected return would fail on this task. The reason is that when making a response the next time steps are occupied by self-feedback, that happens to be uninformative, thus a greedy controller ends up deciding to never act. Including future expected return allows the controller to implicitly look ahead and see that in the long run making an action can provide a better information return than being inactive.

The statistic $$\dfrac{\mathrm{Var}(R_i \mid y_{1:t}, u_{1:t}, H_t = 1)}{o_{i,t} + q_{i,t} + 3} \quad (39)$$

is used by the controller to decide when to act. This statistic is the expected reduction in the variance about $R_1$ provided by a new observation from the period under which $R_1$ actively drives the sensor: a self-feedback period for R1, an agent period for $R_2$ and a background period for $R_3$. The optimal controller thus appears to want to keep the uncertainty about $R_3$ and about $R_2$ within a fixed ratio. If $R_2$, the agent rate, is too uncertain, then the controller chooses to act. If $R_3$, the background rate, is too uncertain then the controller chooses to remain silent, thus gaining information about the background activity rate. It is interesting to note that actions occur when the variance about the background rate $R_3$ is at least 9 times larger than the variance about the agent rate $R_2$. The reason for this particular ratio may be due to the fact that actions are more costly, in terms of information return than lack of action. If the robot acts at time t it gains no information during the times $[t+\tau_1^s, t+\tau_2^s]$ since self-feedback observations are not informative about H. Moreover during times $[t+\tau_1^a, t+\tau_2^a]$ the controller instruct the robot not to act and thus during those periods the robot can only gain information about $R_2$, not $R_3$. By contrast if the robot does not act at time t no time will be wasted on self-feedback. This helps explain why uncertainty about the agent activity rate $R_2$ needs to be larger than the uncertainty about the background activity rate, $R_3$, before an action occurs.

5 INFOMAX CONTROL AS A FORM OF SELF-SUPERVISED LEARNING

The main thing here is that the system is never explicitly informed of the failure or success, i.e., the true value of H. In principle, a system can learn an optimal policy simply by interacting with the world without ever being told whether an agent was really present or absent. This is important for models of development in which external critic may not be available. Some have recently referred to this form of learning as self-supervised.

Reinforcement learning can be seen as a branch of optimal control theory which relies on sampling methods to find optimal controllers. As such we could have used reinforcement learning approaches, instead of dynamic programming to develop the optimal Infomax controller. What dynamic programming gave is formal assurance that the controller was optimal, i.e., no other controller could be better than the one we found.

6 UNDERSTANDING 43 SECONDS OF AN INFANT'S DAY

In this section, we apply the optimal Infomax controller to gain a qualitative understanding of the first 43 seconds of the experimental session with Baby-9, as described in Section 1.1. During this time Baby-9 produced 7 vocalizations, which occurred at the following times in seconds from the start of the experiment: (e.g., see non-Patent Literatures 5.58, 9.44, 20.12, 25.56, 32.1, 37.9, 41.7). Each of these vocalizations were as follows: (see, e.g., 4.22, 10.32, 5.32, 6.14, 5.44, 3.56). Most people agree that by the third or 4th vocalizations the infant knows that there is a responsive agent in the room.

Figure 6A:
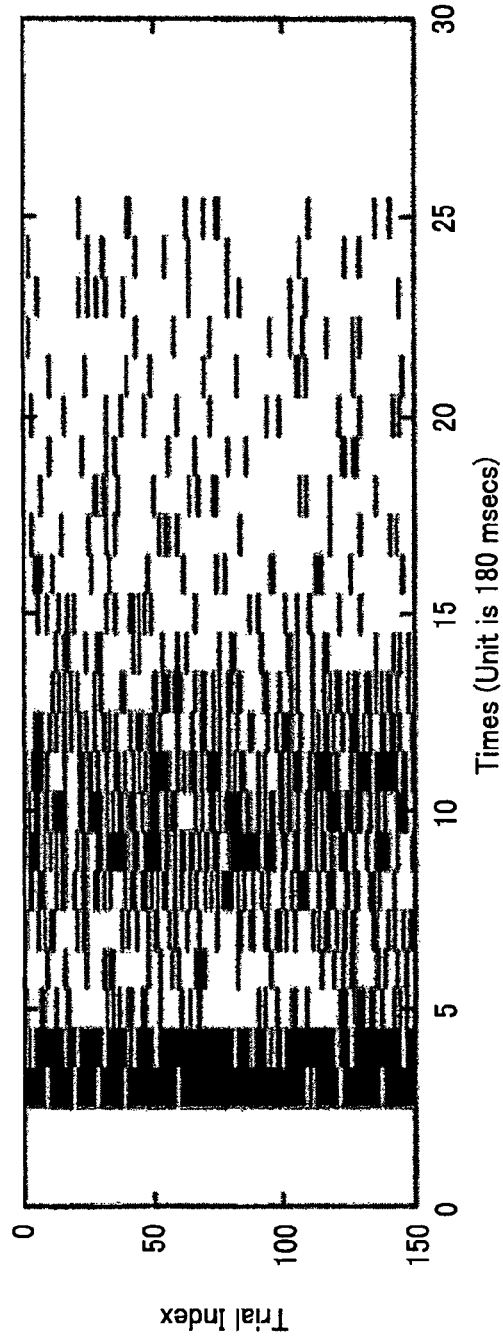
FIG. 6(A) is a raster diagram 150 times of tests or trials.
Figure 6B:
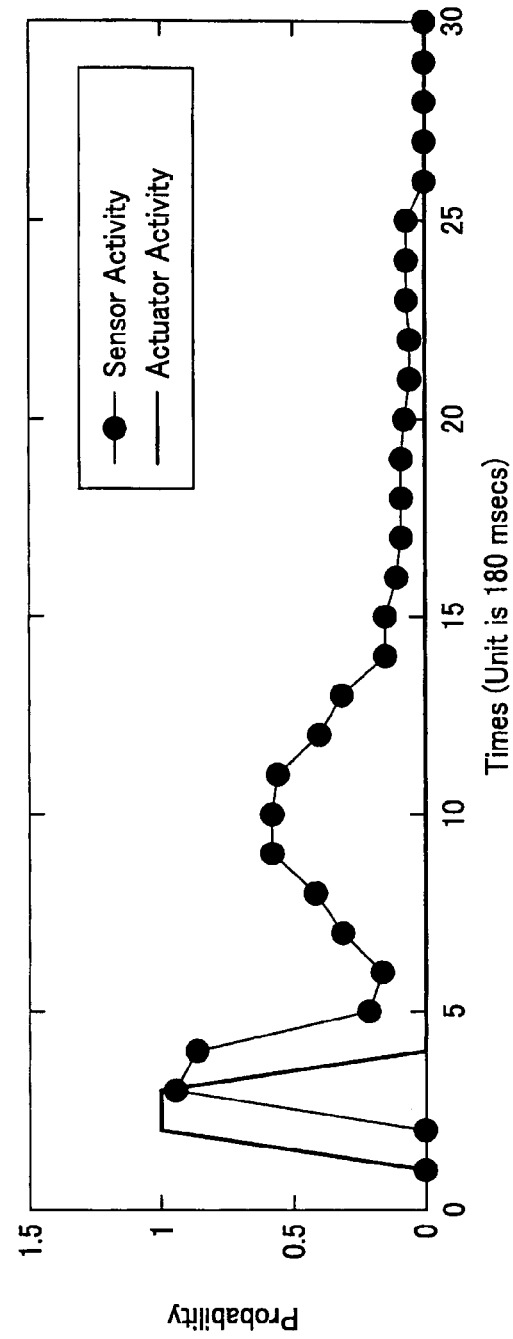
FIG. 6(B) is a view showing that the probability of time in which voice sensor is active is function of time.

The Infomax control model presented in the Section 3.4 requires setting five parameters: The sampling period for the time discrimination, the self-delay parameters, and the agent delay parameters. We run a pilot study to get rough estimates of these parameters. For the agent latency parameters $\tau 1a$, $\tau 2a$, we asked 4 people, unaware of the purpose of the study, to talk to a computer animated character. The age of the 4 partitions were 4, 6 24 and 35 years. We used an optimal encoder to binarize the activity of an auditory sensor and plotted the probability of activation of this binary sensor as a function of time over 150 trials. Each trial started with a vocalization of the animated character and ended 4 seconds later. The results are displayed on FIG. 6. The top graph in the figure shows the activity of the acoustic sensor as a function of time from the beginning of the character's vocalization over 150 trials. Each horizontal line is a different trial. The first vertical bar is due to self-feedback from the character. By about 1200 to 1440 msec after the end of the vocalization from the animated character there is another peak of activity in the sensor, which is now caused by the vocalizations of the human participants. The lower graph of the Figure shows the probability of sensor activity as a function of time, collapsed across trials. Note the first peak in activity due to self-feedback, and the gradual raise and fall in sensor activity due to the human response. Based on this graph we run a simulation of the optimal controller, as defined in (4) with the following parameters: $\Delta t=800$ msec, $\tau_1^s = \tau_2^s = 0$, $\tau_1^a = 1$; $\tau_2^a = 3$. In other words, we let self-delay to be negligible with respect to the expected delays in human responses, and we bracket the human activity to occur within 800 to 2400 milliseconds. We set $\pi=0.01$ to simulate a worst case scenario, thus requiring more data to decide that there is a responsive system.

(A), (B), (C), (D) of FIG. 7 shows the results of the simulation. The horizontal axis in all the graphs is time, measured in seconds. The top graph shows the vocalizations of the optimal controller, which now plays the role of Baby-9. The controller produced 6 vocalizations over a period of 43 seconds. The average interval between vocalizations was 5.92 seconds, compared to 5.833 secs for Baby-9. The difference is not significant using a standard T-test (T(9)=0.08, p=0.94).

The graph of (B) of FIG. 7 shows the system's beliefs about the presence of a responsive agent. By the fourth response, thirty seconds into the experiment, this probability passes the 0.5 level. The third graph shows the posterior probability distributions about the agent and background response rates by the end of the 43 second period. Finally the last graph shows the ratio between the uncertainty about the sensor rate during agent periods and the rate during background periods. Note when this ratio reaches the value of 9, the simulated baby makes a response.

Accordingly, the model thus shows that Baby-9 scheduled his responses and made decisions about the responsiveness of social agents in an optimal manner, given the statistics of times delays and levels of uncertainty typically found in social interactions. The model also is consistent with the idea that Baby-9 was "asking questions" to the robot, in the sense that his vocalizations were scheduled in a manner that maximized the information returned about the responsiveness of the robot. Another point of interest is that the optimal controller exhibits turn-taking, i.e., after an action is produced the controller waits for a period of time, an average of 5.92 seconds, before vocalizing again. The period between vocalizations is not fixed and depends on the relative uncertainty about the levels of responsiveness of the agent and the background. For example, if unexpected background activity occurs, the controller automatically increases the period between vocalizations to better "understand" the changes in background activity. If unexpected agent activity occurs, the controller increases the response rate accelerating the gathering of information about agent periods.

7 REAL TIME ROBOT IMPLEMENTATION

To investigate this issue we implemented the optimal Infomax controller described in previous sections on RobovieM, a humanoid robot developed at ATR's Intelligent Robotics laboratory. While the robot was not strictly necessary to test the real time controller, it greatly helped improve the quality of the interactions developed between humans and machine thus providing a more realistic way for testing the controller. RobovieM has 22 degrees of freedom (1 dof shoulder, 1 dof waist, 2×4 dof arms, and 2×6 dof legs). It's height is 29 cm, and it weights approximately 1.9 Kg. Control of the corresponding 22 servos is handled by an H8 16 MHz microcontroller. The real time Infomax controller was implemented in Java and run on a host computer, a Mac PowerBook G4 which displayed graphically different states of the controller in real time, e.g., the posterior distribution of the different hidden variables. Communication between the host computer and the controller was handled in a wireless manner using a bluetooth to serial adapter from Wireless Cables Inc. The current version of the Infomax controller requires a 1 bit sensor and a 1 bit actuator. For sensor we chose to average acoustic energy over 500 msec windows and discretize it using a 1 bit optimal coder. The actuator was a small loudspeaker producing a 200 msec robotic sound. The self-time delay parameters of the controller were chosen by measuring the time delay between issuing a command to produce a sound and receiving feedback from the audio sensor. The agent delay parameters were the same as in the simulation of Baby-9 (see Section 6).

In addition to the robot's vocalizations its posture changed based on the controller's belief on the presence/absence of a responsive agent: a posture that indicated a high level of attention when the controller believed an agent was present, and a posture that indicated boredom when it is believed that an agent was not present.

7.1 Non-Stationary Environments

In the model presented here the state of the agent and background, which are represented by the variables R and H are random but stationary. For realistic implementations we need for H and R to be able to change over time. Unfortunately in such case computation of the optimal controller can be shown to be intractable. We approximate the situation by assuming that past observations become irrelevant as a function of time in an exponential manner. Under this approximation we simply collect an exponentially smoothed running average of $O_r$, Qt and apply the standard controller on these running averages. The time constant for the exponential smoother was 30 seconds, reflecting the idea that one should not expect for the situation to be stationary beyond 30 seconds.

7.2 Qualitative Evaluation

Our goal was to explore whether or not contingency can be used as a reliable source of information. The answer is a resounding "yes". It is reliable and it has very low requirements in terms of computation and bandwidth. Lacking quantitative evaluations we will present a qualitative evaluation based on our experience demonstrating the system at public gatherings. In standard office environments, with relatively high levels of noise, the controller decides in a few trials whether or not a responsive agent is present. Particularly effective are transition points in which agents switch from talking to the robot to talking to somebody else. The robot detects quite reliably this fact within a few seconds and with a minimum computational cost. We have demonstrated the system at 4 scientific talks, and at two conferences: ICDL04 and NIPS04. Demonstrations at talks, which generally have relatively low noise levels work well. At ICDL04 the poster room was quite noisy and it took a bit longer for the controller to make reliable decisions. Overall the level of performance was remarkable considering the difficulty of the situation. At NIPS04 the conditions were extremely noisy. Talking loud in many cases was not sufficient to understand each other. Under these conditions for the controller to work reliably humans had to talk loud and stay close to the robot.

In the case where this method is applied to the human type robot, it can be used along with the camera input.

This is linked with various representation ability of robot to thereby provide a device capable of performing closer interaction between the robot and the user.

In the fundamental invention part, sound or voice handles modal as input/output of robot.

As result, it is possible to process, by indirect corner control, actuator based on image input or sensor input by behavior output.

Although this is only as example, when motion having the predetermined numerical quantity is detected by the camera image input in the external world and optical defect calculation technology, sensor input 1 is inputted.

In addition to the above, constant behavior output command which has endowed peace in advance is executed for output 1.

As a result, contingency search by image input becomes effective. In the entertainment robot, element ability of the representation which does not allow user to be tired.

8 APPLICATION EXAMPLES OF THE INVENTION

Two embodiments are illustrated below as application examples of the fundamental invention.

Application Example 1

Since behavior is observed and representation considers the fact of the output, its behavior is imitated on the basis of indirect corner control.

There can be applied a method in which behavior is observed and possibility after calculated by the invention which constitutes basis to a degree of model of imitation is used.

Indirect actuators of robot are used. Each of them is observed and imitated. In addition, it is possible to output movement of the human being which is the interaction object in order to obtain more knowledge from camera image input.

In the case where it is observed and numeric control of the degree of imitation can be performed, it is conceivable that posterior probability calculated by the invention serving as basis reflects this numeric value.

For object of illustration, there is conceivable a method in which it is observed and indirect corner of the human being is estimated from image input as an imitation method to control indirect corner of robot with respect to target angle.

[Link corner control]=$k1$×[posterior probability value]×[indirect corner value]

In the case where the actuator is moved in accordance with the above-mentioned operation, the actuator indicates similar reaction in robot after work. As a result, the probability value indicates high value such that interaction between user and robot is caused to be causal.

Process of normal process is observed. The process is observed to have degrees more than the imitation. In addition, imitating is dynamic. It is possible to understand that fact. The imitating is dependent and draws attention to interest of user.

$k1$ (Similar also with respect to $k2$) is parameter.

Application Example 2

As expression, change of expression i.e., emotional change is conceivable.

There are various expressions or emotional feelings. However, the simplest implementation is a method for changing luminance of the eye with respect to parameter.

Luminance of LED is set as stated below.

[LED luminance]=$k2$×[probability value after work]

As a result, user is positioned foremost, and luminance of the eye becomes large with interaction which is casual criterion.

More preferable impression can be given to user by the dynamic change process that "this robot gradually recognizes existence of me".

Of course, expression except for LED may be also employed.

Although attention is drawn as only one example, there exists mechanism of robot which changes eyebrow and lip by simple motor control.

In a manner to reflect motion output so that established value rises, a control to indicate powerful smile can be applied by more simple method on the basis of similar principle.

For example, with respect to the application effects of the invention, degree of belief and quantity of dynamic sequence are used to thereby have ability to bring about the feature of change process used. For example, as compared to the technology of rule base as in "output of behavior of the human being with respect to pleasure of discovery", the human being can be positioned in the vicinity of behavior. In addition to the above, the human being can further develop interaction with user.

9 ROBOT APPARATUS IN WHICH THE INTERACTION DEVICE ACCORDING TO AN EMBODIMENT OF THE PRESENT INVENTION IS MOUNTED

Figure 8:
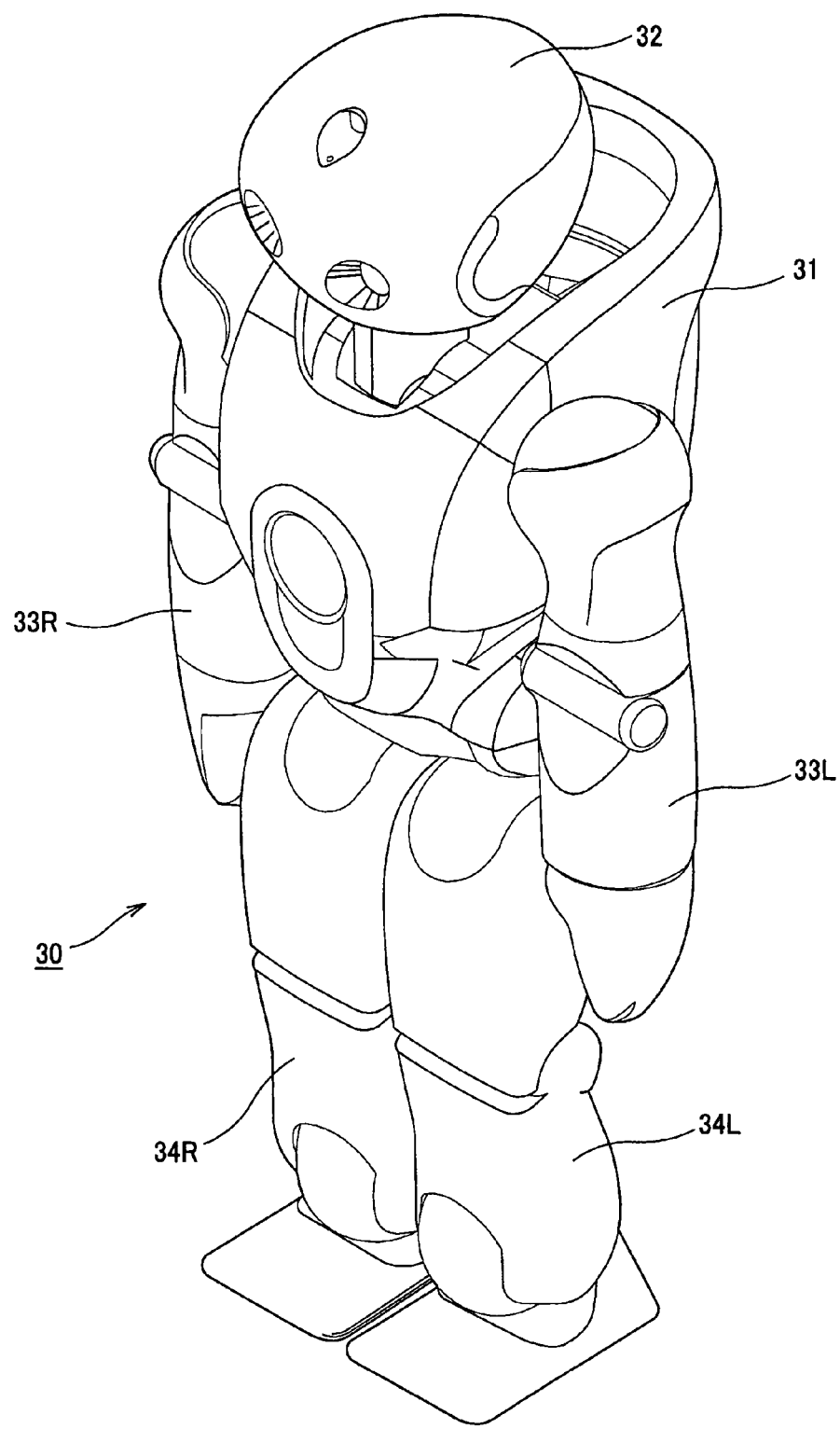
FIG. 8 is a perspective view showing outer shape of a robot apparatus according to this embodiment.

The interaction device can be mounted in a robot apparatus as shown in FIG. 8, for example. A two-foot walking robot apparatus 30 is a practical robot which helps behavior of the human being with respect to life state in ordinary life and/or other situations. The robot apparatus 30 may be also entertainment robot which can perform action in accordance with the internal surface (anger, sad, glad, or pleasure, etc.).

As shown in FIG. 8, the robot apparatus 30 includes a head portion unit 32, right/left units 33R/L, and a right/left leg units 34R/l connected to a specified position of a trunk unit 31. In this inference numeral, characters R and L are suffix respectively indicating right and left. This will similarly be applied to the description below.

Figure 9:
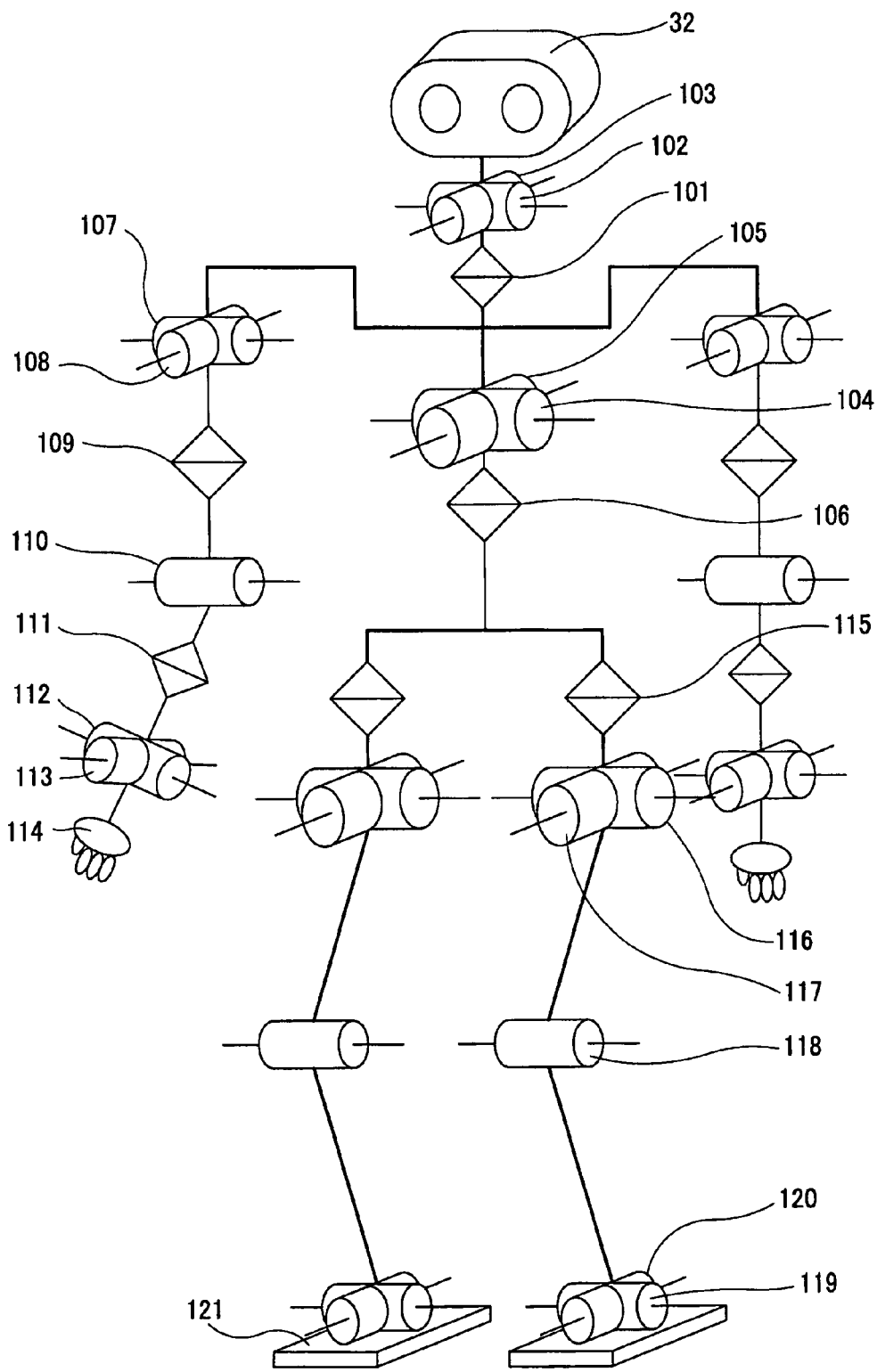
FIG. 9 is a schematic view of the configuration indicating degree of freedom with respect to the robot apparatus.

FIG. 9 shows outline of the structure of the degree of freedom of joint provided with respect to the robot apparatus 30. The neck joint which supports the head portion unit 102 has the degree of freedom of 3, i.e., neck joint lateral fluctuation shaft 101, neck joint longitudinal fluctuation shaft 102, and neck joint roll shaft 103.

Each of arm units 33R/L constituting the upper hand and foot portion is of multi joint degree of freedom structure including a shoulder joint fluctuation shaft 107, a shoulder joint roll shaft 108, an upper arm fluctuation shaft 109, an elbow joint longitudinal fluctuation shaft 110, a front arm lateral fluctuation shaft 111, a hand joint longitudinal fluctuation shaft 112, a hand joint roll shaft 113, and a hand portion 114. The hand portion 114 is of multi joint freedom degree of freedom structure including plural fingers. However, the movement of the hand portion 114 hardly has influence on effect on attitude/walking control of the robot apparatus 1. For simplification, in this specification, the degree of freedom of the robot apparatus 1 is assumed to be zero. Accordingly, the degree of freedom of each arm unit is 7.

The trunk portion 2 has the degree of freedom 3, i.e., a trunk longitudinal fluctuation shaft 104, a trunk roll shaft 105, and a trunk lateral fluctuation shaft 106.

Each of the leg units 34R/L constituting lower hand and foot portion includes a crotch joint lateral fluctuation shaft 115, a crotch joint longitudinal fluctuation shaft 116, a crotch joint roll shaft 117, a knee joint longitudinal fluctuation shaft 118, a foot joint longitudinal fluctuation shaft 119, a foot joint roll shaft 120, and a foot portion 121. In this specification, crossing point of the crotch joint longitudinal fluctuation shaft 116 and the crotch joint roll shaft 117 is defined as the crotch joint position of the robot apparatus 30. The foot portion of the human being corresponding to the foot portion 121 is of the structure including multi-joint multi degree of freedom foot bottom. For simplification, in this specification, the degree of freedom of foot back of the robot apparatus 30 is assumed to be zero. Accordingly, the degree of freedom of each leg unit is 6.

In total, the degree of freedom of the entirety of the robot apparatus 30 is 32 (3+7×2+3+6×2). However, it is not necessarily demanded that the degree of freedom of the entertainment-directed robot apparatus 30 is limited to 32. It is obvious that the degree of freedom, i.e., the number of joints can be increased or decreased in accordance with design or production condition or necessary specification, etc.

In practice, in order to realize the respective degree of freedom provided with respect to the robot apparatus 30, the actuator is used. In consideration of removing swelling appearing to be unnecessary in order to imitate the body style of natural human being to offer attitude control to unstable two-foots walking structure, small and light weight actuator is mainly used. More preferably, there is used small AC servo actuator directly connected to tooth wheels provided with a single chip servo control system attached within the motor unit.

Figure 10:
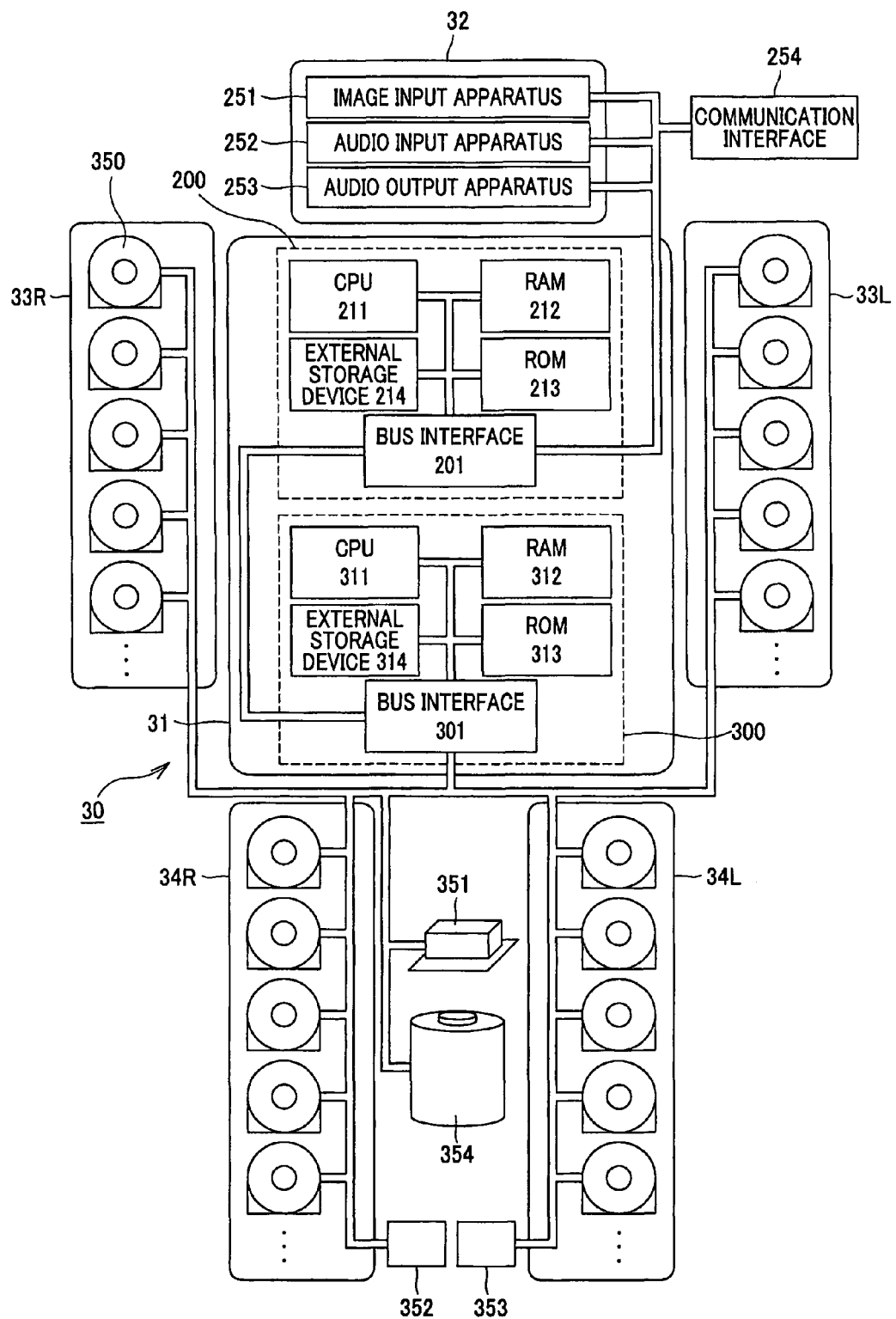
FIG. 10 is a view showing system configuration of the robot apparatus.

Finger 10 shows outline of the control system configuration of the robot apparatus 30. As shown in FIG. 10, the control system includes an inference control module 200 and a motor or motion control module 300. The inference control module 200 controls emotional discrimination and emotional representation in the form of dynamic reaction with respect to user input, etc. The motor control module 300 control the harmonic motion of the entirety of the robot apparatus 30 as in the drive of actuator 350.

The inference control module 200 includes a CPU (Central Processing Unit) for executing calculation process about emotional discrimination and emotional representation, a RAM (Random Access Memory) 212, a ROM (Read Only Memory) 213, and an external storage unit (hard disc drive, etc.) 214. The inference control module 200 is independent driven information processing unit in which processes including all necessary elements within the module are permissible.

The inference control module 200 is supplied with image data from an image input unit 251, audio or sound data from a voice or sound input unit 252, and other data. Responding to these stimulations from the external, the inference control module 220 determines or judges current emotion willing of the robot apparatus 30. The image input unit 251 includes, e.g., plural CCD (Charge Coupled Device) cameras. The voice input unit 252 includes, e.g., plural microphones.

The inference control module 200 issues instruction to the motion control module 300 so as to perform a series of motions or actions on the basis of willing determination, i.e., motion of four hands and feet.

The motion control module 300 includes a CPU 311 for controlling the harmonic motion of the entirety of the robot unit 30, a RAM 312, a ROM 313, and an external memory unit (hard disc drive, etc.) 314. The motion control module 300 is independent driven information processing unit in which processes having all necessary elements within the module are permissible. The external storage unit 314 is ability to store off-line calculation walking pattern, target ZMP orbit and other action schedules. The ZMP is floor surface point to produce zero moment caused by repulsive force of floor during working. The ZMP orbit means the orbit when ZPM moves during walking motion of the robot apparatus 30. With respect to the concept of ZMP and application of ZMP to stability criterion of robot with leg, see Miomil Bucobraobitch "LEGGD LOOMOTION ROBOT" ("Walking robot and artificial leg" translated into the Japanese by Ichiro Kato, Nikkan Kogyo Shinbun Sha).

The motion control module 300 is connected to actuators for realizing respective degrees of freedom distributed over the entire body of the robot apparatus 30 shown in FIG. 9, an attitude sensor 51 for measuring attitude or inclination of the trunk unit 2, ground-contact confirmation sensors 352 and 353 for detecting whether back side surfaces of left and right legs are away from the floor, or in contact with the floor, and a power supply controller 354 for performing management of power supply like battery. These units are connected to the motion control module 300 through an interface (I/F) 301. The attitude sensor 351 is combination of, e.g., acceleration sensor and gyro sensor. The ground touch sensors 352 and 353 include proximity sensor and/or micro-switch, etc.

The inference control module 200 and the motion control module 300 are constructed on a common platform. These two modules are connected with each other by bus interfaces 201 and 301.

The motion control module 300 controls the harmonic motion of the entire body by respective actuators 350 in order to realize action instructed from inference control module 200. The CPU 311 reads out correspondence operation pattern from the external storage unit 314 in correspondence with the action instructed from the inference control module 200. Alternatively, the CPU 311 generates operation pattern.

In accordance with the predetermined operation pattern, the CPU 311 sets motion of foot portion, ZMP orbit, motion of west, motion of upper hand and arm, portion horizontal position of west, and height, etc. The CPU 311 then transfers command value to the actuator 350. The command value determines the operation in accordance with set content.

In order to detect attitude or inclination of the trunk unit 31 of the robot apparatus 30, the CPU 311 uses an output signal from the attitude sensor 351. In addition to the above, in order whether respective leg units 5R/L are not used, or are being raised, the CPU 311 uses an output signal from the ground touch confirmation sensors 352 and 353. By this method, the CPU 311 can perform adaptive control of harmonic motion of the entire body of the robot apparatus 30.

Further, in order that the ZMP position is consistently directed to the center of the ZMP stabilization area, the CPU 311 controls the attitude and the operation of the robot apparatus 30.

The motion control module 300 notifies the inference control module 200 of processing state, i.e., to what degree the motion control module 300 executes action in accordance with determination or judgment which has been performed by the inference control module 200.

By this method, the robot apparatus 30 can judge its environment and peripheral environment on the basis of the control program thus to have ability to independently perform action.

In the robot apparatus 30, in order to implement, e.g., the above-mentioned image recognition function, the ROM 213 of the inference control module 200 stores program (including data). In this case, the CPU 211 executes image recognition program.

Since the above-mentioned image recognition function is installed, the robot apparatus 30 can precisely extract prior memory model from image data delivered through the image input unit 251. For example, in the case where the robot apparatus performs independent-walking, there are instances where there may be a necessity to search intended model from surrounding image recorded by CCD camera of the image input unit 251. In this case, there are many instances where the model is partially hidden by other obstacle. It is possible to vary view point and luminance. Even in such case, the above-mentioned image recognition technology can precisely extract the model.

In the above-mentioned embodiment, in the state where attention is drawn to the degree of belief or conviction to determine action output of the robot apparatus in such a manner to maximize mutual information quantity defined between the external world and own output.

10 OTHER EMBODIMENTS OF THE PRESENT INVENTION

On the contrary, in the embodiments explained below, there is employed an approach in which attention is drawn to the degree of belief or conviction that the interaction object may have when viewed from the robot apparatus to determine action output of the robot apparatus in such a manner to maximize mutual information quantity defined therefrom.

This corresponds to the fact to infer feeling of interaction object (corresponding to the concept called "Theory of Mind" in psychology) to carry out action from this side (robot apparatus side) so as to maximize information quantity with respect to the opposite side, i.e., to give information quantity which is more with respect to the opposite side, so-called perform action stance opposite to the preceding embodiment on the basis of similar methodical theory. This will now be explained by taking, as an example, robot apparatus including simple voice input/output unit as a practical example.

Here, let consider the scene where the robot apparatus performs interaction with interaction object (human being or other robot, etc.) by simple exchange of sound or voice.

Figure 11:
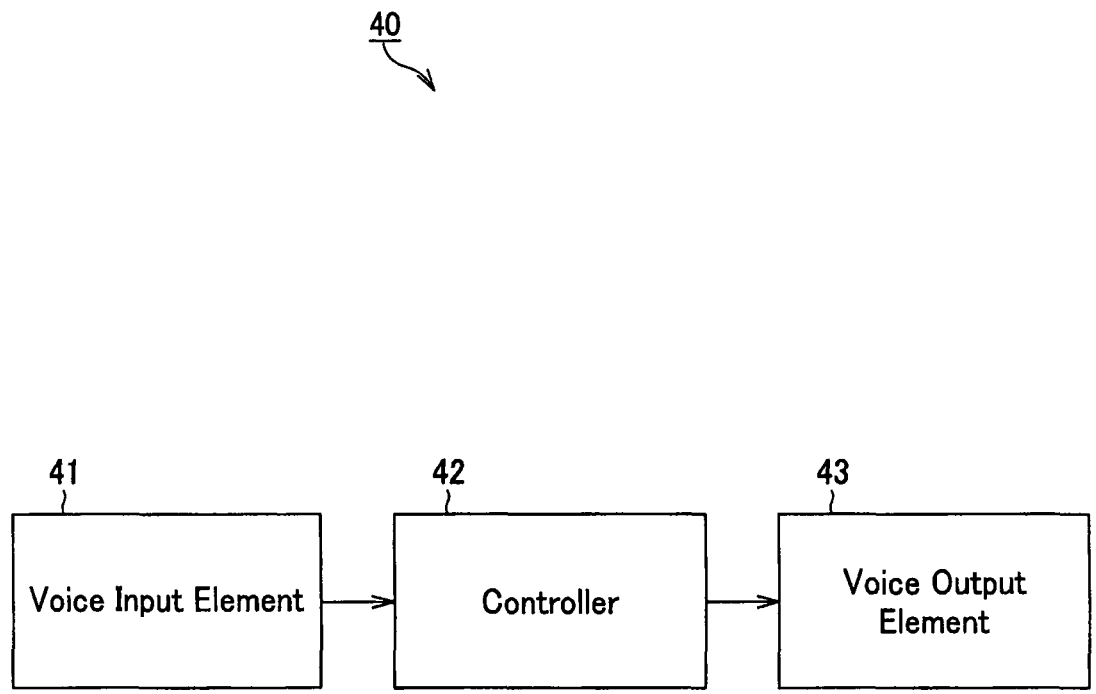
FIG. 11 is a view showing another system configuration of the robot apparatus according to an embodiment of the present invention.

A robot apparatus 40 shown in FIG. 11 includes a voice input element 41. This is microphone device. Further, when sound volume of the external field is above a predetermined level, the voice input element 41 inputs discrete value 1. When otherwise, the voice input element 41 inputs 0 (zero) every unit time. A voice output element 42 is a speaker device, and outputs a predetermined arbitrary sound (e.g., calling sound like "piroro") every unit time on the basis of instruction from a controller 43 in the case where control output value is 1, and performs muting output in the case where the control output value is 0 (zero).

The controller 43 determines control output at the current step on the basis of input/output past record until the previous time step to send it to the voice output element 42. The theoretical methodical theory of mind as recited in the beginning, i.e., a method of setting the controller 43 which performs action in such a manner that the opposite side feels more preferably (this rule will be described later) while standing position of the opposite side to look at own action will be described.

Figure 12:
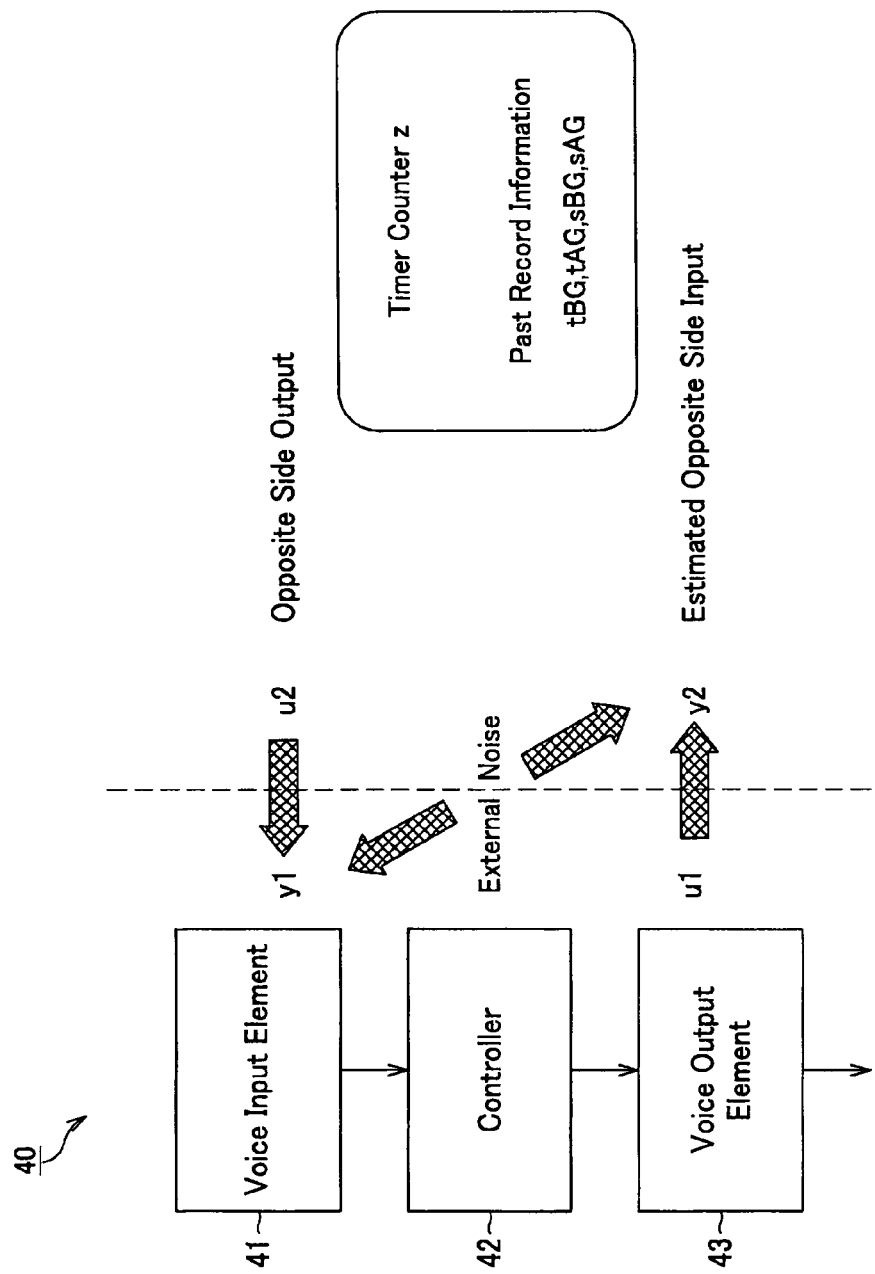
FIG. 12 is a view used for explanation of the operation of the robot apparatus shown in FIG. 11.

When it is assumed as shown in FIG. 12 that the robot apparatus 40 performs voice output "u1=1" at a certain time point, it is considered that sensor input of the opposite side (estimated opposite side input) becomes "y2=1" irrespective of external noise. Further, when it is assumed that the opposite side performs voice output "u2=1", the sensor input of the opposite side becomes "y1=1" irrespective of external noise.

The robot apparatus 40 updates, every time, five variables described below relating to the state of the opposite side on the basis of own sensor input/output to hold them.

How many steps are passed from the fact that interaction object performs action "u2=1" is recorded. This value is designated as parameter in terms of maximum value kappa. There is no possibility that there may result in this value or more. By using time counter z (in fact value preceding by one step in terms of time z (t−1)), whether the instruction object belongs to either Agent period or Background period at present is judged on the basis of the following rule.

if z(t−1)<(kappa−1) then currently in Agent period
if z(t−1)>=(kappa−1) then currently in Background period The time counter z itself is updated in accordance with the rule described below.

if u2($t$)=1 then z(t)=1
if u2($t$)=0 then z(t)=z(t−1)+1, although z(t)=kappa if z(t−1)=kappa.

The Agent period means timing at which contingent instruction may take place, i.e., that if there is response within this period, interaction at that time is contingent. The Background period means period except for that, i.e., period in which timing is escaped so that corresponding reaction is considered to be non-contingent reaction.

The idea which is the key point of the Bayesian's estimation performed on the basis of four variables defined below is to compare responsive past records in respective two periods to perform formalization on the basis of the framework of the Bayesian's estimation in the binomial distribution so that according as reaction in the former (Agent period) statistically becomes large, the degree of belief or conviction to believe that the human being (robot in this case) exists at the external world becomes higher.

Four variables are defined in a manner described below.
tBG: total number of Background periods experienced until that time point
tAG: total number of Agent periods experienced until that time point
sBG: total recording number of sensors 1 (y2=1 or noise N=1) within tBG
sAG: total recording number of sensors 1 (y2=1 or noise N=1) within tAG In actual, consideration is made such that y2=u1 and u2=u1 (theoretical approach of the mind)

By supposing past record variable sets and Beta distribution as noise distribution which have been described above, the degree of belief or conviction of the interaction object can be calculated in the form of probability value p2($t$) of the interaction object from data momentarily obtained (the above-mentioned five variables) on the basis of an arbitrary prior distribution (prior distribution relating to Beta function and parameters). The technology used in this calculation process is utilization of the Bayesian estimation, particularly the property of natural conjugate distribution similarly to the previously described embodiments.

Here, in this embodiment, in setting controller 43 to behave so that there result preferable situation with respect to the interaction object, two methods described below are conceivable as scale of desirableness.

Scale 1: Method of using probability value p2 as it is

In this case, there is provided a scale such that according as the probability value becomes higher, it is preferable, i.e., the interaction object is convinced of existence of interaction object (human being or robot) (viewed from him) before his eyes, it is preferable for him.

Scale 2: Method of using entropy p2*log(p2)+(1−p2)*log (1−p2) defined from probability value p2

In this case, the method is equivalent to information quantity maximization category as described in the following reference literatures. This meaning in the present invention is the scale that according as acquisition information quantity of the interaction object becomes maximum, it is preferable. In the reference literatures described below, although setting of problem is differently made, it is reported that in the case where controller setting based on the information quantity maximization category is performed, behavior of that controller becomes close to the human being.

Reference Literature "An Infomax Controller for Real-Time Detection of Social Contingency", Javier R. Movellan, Proc. Of the 4th IEEE International Conference on Development and Learning 2005.

When either one of scales mentioned here is considered as award value, it is possible to acquire a controller to maximize expectation acquisition award value over future time by the existing reinforcement learning method (e.g., Q-learning). This method can be performed by the computer simulation. If finally obtained optimal controller is copied as controller 43 of the robot apparatus 40, the target goal can be realized.

In order to perform reinforcement learning method, it is necessary to define the state in addition to award value. In this case, the state is nothing but set of five variables defined above. If action value u1 of the robot is determined by random selection to perform Q-learning by a large number of computer simulations, optimal controller based on the acquired Q-value can be obtained.

In a manner as stated above, it is possible to realize controller 43 of the robot apparatus 40 which behaves preferably for the interaction object.

It is to be noted that the present invention is not limited to the above-mentioned embodiments related to the accompanying drawings. Further, it is understood from persons skilled in the art that various changes or alternatives may be performed, or equivalents thereof may be prepared without departing from the spirit and the scope of the appended claims.

11 APPENDIX I

Summary of Model

Parameter:

$\Delta t \in R$, Sampling period in seconds (40)

$\pi \in [0,1]$, Prior on H (41)

$0 \leq \tau_1^s \leq \tau_2^s$, Delay parameters for self-feedback loop (42)

$\tau_2^s < \tau_1^a \leq \tau_2^a$, Delay parameters for social agents (43)

$(\beta_{i,1}, \beta_{i,2})$, $i=1,2,3$ Parameters for Beta Prior distribution for $R_1, R_2, R_3$ (44)

Static Random Variable:

$H \sim \text{Bernoulli}(\pi)$, Presence/Absence of Responsive Agent (45)

$R_1 \sim \text{Beta}(\beta_{1,1}, \beta_{1,2})$, Self Activity Rate (46)

$R_2 \sim \text{Beta}(\beta_{2,1}, \beta_{2,2})$, Agent Activity Rate (47)

$R_3$, Background Activity Rate: (48)

$R_3 \sim \text{Beta}(\beta_{3,1}, \beta_{3,2})$, If $H=1$ (49)

$qR_3 = R_2$, If $H=0$ (50)

Stochastic Process:
The following process is defined in connection with the case where t=2, 3, ...

Timer: 
$$Z_t \stackrel{def}{=} \begin{cases} \tau_2^q + 1 & \text{if } t=1 \text{ and } U_t=0 \\ 0 & \text{if } t \geq 1 \text{ and } U_t=1 \\ Z_{t-1} & \text{if } t > 1 \text{ and } U_t=0 \text{ and } Z_{t-1} > \tau_2^a \\ 1 + Z_{t-1} & \text{else} \end{cases}$$ (51)

Indicators: $I_t = (I_{1,t}, I_{2,t}, I_{3,t})^T \in \{0,1\}^3$ (52)

Indicator of Self Period: $I_{1,t} = \begin{cases} 1 & \text{if } Z_t \in [\tau_1^s, \tau_2^s] \\ 0 & \text{else} \end{cases}$ (53)

Indicator of Agent Period: $I_{2,t} = \begin{cases} 1 & \text{if } Z_t \in [\tau_1^a, \tau_2^a] \\ 0 & \text{else} \end{cases}$ (54)

Indicator of Background Period: $I_{3,t} = (1 - I_{1,t})(1 - I_{2,t})$ (55)

Drivers: $D_t = (D_{1,t}, D_{2,t}, D_{3,t})^T \in \{0,1\}^3$ (56)

Self Driver: $D_{1,t} \sim \text{Poison}(R_1)$ (57)

Agent Driver: $D_{2,t} \sim \text{Poison}(R_2)$ (58)

Background Driver: $D_{3,t} \sim \text{Poison}(R_3)$ (59)

Robot Sensor: $Y_t = I_t \cdot D_t$ (60)

Robot Actuator: $U_t$ (61)

Sensor Activity Counters: $O_{1,t} = \sum_{s=1}^{t} I_{i,t} Y_t$, for $i = 1, 2, 3$ (62)

Sensor Inactivity Counters: $Q_{1,t} = \sum_{s=1}^{t} I_{i,t}(1 - Y_t)$, for $i = 1, 2, 3$ (63)

Stochastic Constraint:

FIG. 4 shows Markov constraint in coupling distribution of different variables included in the Model.

12 APPENDIX II

Solution of Bellman's Optimality Equation

In this appendix, the notation and the components which have been presented in the section 3. 4 are used as the premise. It is assumed that $S_{t'}\stackrel{def}{=}(O_{t'}, Q_{t'}, Z_{t'})$ with respect to all $t' \in [t+1, T]$, and $(y_{1:t'}, u_{1:t'}, o_{t'}, q_{t'}', z_{t'})$ is fixed arbitrary sampling from $(Y_{1:t'}, U_{1:t'}, O_{t'}, Q_{t'}, Z_{t'})$. First, it is indicated that the following characteristic is satisfied with respect to $t' > x$.

(1) There exists function $g_{t'}$ such that $S_{t'} = g_{t'}(S_{t'-1}, Y_{t'}, U_{t'})$ is provided.

(2) $p(y_{t'+1}|y_{1:t'}, u_{1:t'+1}) = p(y_{t'+1}|s_{t'}, u_{1:t'+1})$ (3) $W_{t'} \in \sigma\{S_{t'}\}$ The characteristic (1) merely states that $S_{t'}$ can be calculated from $S_{t'-1}$, and $Y_{t'}$, $U_{t'}$ by the recursion. On the assumption of the definition of $S_{t'}$, this is clearly true. In connection with the characteristic (2), note $$p(Y_{t'+1}=1 \mid y_{1:t'}, u_{1:t'+1}) = \sum_h \frac{p(h \mid o_{t'}, q_{t'})p}{(Y_{t'+1}=1 \mid y_{1:t'}, u_{1:t'+1}, h)} \quad (64)$$

$$= \sum_h \frac{p(h \mid o_{t'}, q_{t'})}{E[R \cdot I_{t'+1} \mid y_{1:t'}, u_{1:t'+1}, h]} \quad (65)$$

Here, $I_{t'}$ is three-dimensional binary vector having singular 1 of which position is determined by $Z_{t'}$. Accordingly, $E[R \cdot I_{t'+1}|o_{t'}, q_{t'}, z_{t'}, u_{t'+1}, h]$ is expectation value of velocity in Poisson's process which is well-selected by $Z_{t'}$. From (15), with respect to i=1, 2, 3, the following equation is obtained $$p(r_i|y_{1:t'}, u_{1:t'}, H=1) = \text{Beta}(r_i|\beta_{i,1}+o_{i,t'}, \beta_{i,2}+q_{i,t'}) \quad (66)$$

Accordingly, the following equation is obtained by using the equation (86)

$$E[R_i|y_{1:t'}, u_{1:t'+1}, H=1] = \frac{\beta_{i,1}+o_{i,t'}}{\beta_{i,1}+\beta_{i,2}+o_{i,t'}+q_{i,t'}} \quad (67)$$

$$E[R_1|y_{1:t'}, u_{1:t'+1}, H=0] = \frac{\beta_{1,1}+o_{1,t'}}{\beta_{1,1}+\beta_{1,2}+o_{1,t'}+q_{1,t'}} \quad (68)$$

$$E[R_2|y_{1:t'}, u_{1:t'+1}, H=0] = E[R_3|y_{1:t'}, u_{1:t'+1}, H=0] \quad (69)$$

$$= \frac{\beta_{2,1}+o_{2,t'}+o_{3,t'}}{\beta_{2,1}+\beta_{2,2}+o_{2,t'}+o_{3,t'}+q_{2,t'}+q_{t',e}}$$

Accordingly, estimated distribution at time $t'+1$ is function of $S_{t'}$, $U_{t+1}$. From this, (2) is obtained. The characteristic (3) is directly obtained from (24).

Then, these characteristics are used to derive algorithm for discovering optimal Infomax controller. First, the characteristics (1) and (3) are combined so that the following equation can be obtained.

$$W_{t'+1} \in \sigma\{S_{t'+1}\} = \sigma\{S_{t'}, Y_{t'+1}, U_{t'+1}\}, \text{ for } t' \in [t, T-1] \quad (70)$$

Use of combination of this fact and (1) gives the following equation.

$$E[W_{t'+1}|y_{1:t'}, u_{1:t'+1}] = \sum_{y_{t'+1}} p(y_{t'+1}|y_{1:t'}, u_{1:t'+1}) \quad (71)$$

$$E(W_{t'+1}|s_t, y_{t'+1}, u_{t'+1})$$

$$= E[W_{t'+1}|s_{t'}, u_{t'+1}]$$

Then, it is assumed that $t'=T$. Since no return exists after T, the following equation can be obtained.

$$V_T(y_{1:T}, u_{1:T}) = 0 \quad (72)$$

Accordingly, it is obvious that value of sequence $(y_{1:t'}, U_{1:t'})$ can be calculated as function of its relevant statistical value st in connection with the case where $t'=T$.

$$\tilde{V}_T(s_T) \stackrel{def}{=} 0 \quad (73)$$

In connection with the case where $t'=T-1$, functions F', N', V', C' to calculate F, N, V, C of sequence $(y_{1:t'}, u_{1:t'})$ is defined on the basis of statistical value $s_{t'}$ of its sequence.

$$N'_{t'}(s_{t'}, u_{t'+1}) \stackrel{def}{=} N_{t'}(y_{1:t'}, u_{1:t'}, u_{t'+1}) \quad (74)$$

$$= E[W_{t'+1}|y_{1:t'}, u_{1:t'+1}]$$

$$= E[W_{t'+1}|s_{t'}, u_{t'+1}]$$

$$F'_{t'}(s_{t'}, u_{s+1}) \stackrel{def}{=} F_{t'}(y_{1:t'}, u_{1:t'}, u_{t'+1}) \quad (75)$$

$$= E[V_{t'+1}(y_{t'}, Y_{t'+1}, u_{1:t'+1})|y_{1:t'}, u_{1:t'+1}] = 0$$

$$V'_{t'}(s_{t'}) \stackrel{def}{=} V_{t'}(y_{1:t'}, u_{1:t'}) \quad (76)$$

$$= \max_{u_{t'+1}} N'_{t'}(s_{t'}, u_{t'+1}) + F'_{t'}(s_{t'}, u_{t'+1})$$

$$= \max_{u_{t'+1}} N'_{t'}(s_{t'}, u_{t'+1})$$

$$\hat{C}'_{t'}(s_{t'}) \stackrel{def}{=} \hat{C}_{t'}(y_{1:t'}, u_{1:t'}) \quad (77)$$

$$= \text{argmax}_{u_{t'+1}} N'_{t'}(s_{t'}, u_{t'+1}) + F'_{t'}(s_{t'}, u_{t'+1})$$

The same logic can be used also in the case where $t'=T-2$.

$$N'_{t'}(s_{t'}, , u_{t'+1}) \stackrel{def}{=} N_{t'}(y_{1:t'}, u_{1:t'}, u_{t'+1}) \quad (78)$$

$$= E[W_{t'+1}|y_{1:t'}, u_{1:t'+1}]$$

$$= E[W_{t'+1}|s_{t'}, u_{t'+1}]$$

$$F'_{t'}(s_{t'}, u_{t'+1}) \stackrel{def}{=} F_{t'}(y_{1:t'}, u_{1:t'}, u_{t'+1}) \quad (79)$$

$$= E[V_{t'+1}(y_{t'}, Y_{t'+1}, u_{1:t'+1})|y_{1:t'}, u_{1:t'+1}]$$

$$= \sum_{y_{t'+1}} p(y_{t'+1}|y_{1:t'}, u_{1:t'+1})V_{t'+1} \quad (80)$$

$$(y_{1:t'+1}, u_{1:t'+1})$$

$$= \sum_{y_{t'+1}} p(y_{t'+1}|s_{t'}, u_{t'+1})V'(s_{t'+1}) \quad (81)$$

$$V'_{t'}(s_{t'}) \stackrel{def}{=} V_{t'}(y_{1:t'}, u_{1:t'}) \quad (82)$$

$$= \max_{u_{t'+1}} N'_{t'}(s_{t'}, u_{t'+1}) + F'_{t'}(s_{t'}, u_{t'+1})$$

$$\hat{C}'_{t'}(s_{t'}) \stackrel{def}{=} \hat{C}_{t'}(y_{1:t'}, u_{1:t'}) \quad (83)$$

$$= \text{argmax}_{u_{t'+1}} N'_{t'}(s_{t'}, u_{t'+1}) + F'_{t'}(s_{t'}, u_{t'+1})$$

Here, $s_{t'+1} \stackrel{def}{=} g_{t'}(s_{t'}, g_{t'+1}, u_{t'+1})$. The steps (78)~(83) can be optimally applied to the case where $t'=T-2, T-3, \ldots$ t.

Accordingly, the optimal controller is recovered. Attention should be drawn to the fact that the controller maps statistical value st' onto action $U_{t'}$ with respect to respective times $t' \in [t, T]$.

13 APPENDIX III

Definition

Beta Variable $$R \sim \text{Beta}(\beta_1, \beta_2) \tag{84}$$

$$p(r) = \text{Beta}(r, \beta_1, \beta_2) = \frac{\Gamma(\beta_1 + \beta_2)}{\Gamma(\beta_1)\Gamma(\beta_2)}(r)^{\beta_1 - 1}(1 - r)^{\beta_2 - 1} \tag{85}$$

$$E(R) = \frac{\beta_1}{\beta_1 + \beta_2} \tag{86}$$

$$\text{Var}(R) = \frac{\beta_1 \beta_2}{(\beta_1 + \beta_2)^2 (\beta_1 + \beta_2 + 1)} \tag{87}$$

The following formula provides parameter of Beta distribution to collate a desired mean m and variance s2.

$$\beta_1 = \frac{1 - m - c^2 m}{c^2} \tag{88}$$

$$\beta_2 = \frac{1 - m}{m} \beta_1 \tag{89}$$

$$c \stackrel{def}{=} \frac{s}{m} \tag{90}$$

Gamma Function $$\Gamma(x) = \int_0^\infty u^{x-1} e^{-u} du, \text{ for } x > 0 \tag{91}$$

Gamma function has the following characteristic.

$$\Gamma(x+1) = x\Gamma(x) \tag{92}$$

$$\Gamma(x) = (n-1)!, \text{ for } n = 1, 2 \ldots \tag{93}$$

Logistic Function $$\text{logistic}(x) = \frac{1}{1 + e^{-x}} \tag{94}$$

Suppose expectation value: Y in the case where sigma set is given is integral number random variable on probability space ($\Omega$, F, P), i.e., E (1Y1)$\in$R, and $\sigma \in$F is sigma algebra. Conditional expectation value in the case where Y is given is P quasi-assumed eigen random variable.

E (Y|$\sigma$) is $\sigma$-observable.

For arbitrary A$\in\sigma$, $\int A$ E (Y|$\sigma$) dP=$\int A$ YdP.

In the case where E (Y2)$\in$R, E (Y|$\sigma$) is P-quasi assumed eigen $\sigma$ observable random variable closes t to Y inn the sense of minimum square, i.e., is represented as below.

$$E[Y - E[Y|\sigma]]^2 = \inf_{Z \in \sigma} E[Y - Z]^2 \tag{95}$$

Suppose X is random variable of the same probability space as Y, and $\sigma(X)$ is sigma algebra derived by X. Expectation value of Y in the case where X is given is expectation value of Y in the case where $\sigma(X)$ is given, i.e., is represented as below.

$$E[Y|X] \stackrel{def}{=} E[Y|\sigma(X)] \tag{96}$$

Entropy:

$$H(Y) = -\int p(y) \log p(y) dy \tag{97}$$

Conditional Entropy $$H(Y|X) = -\int p(x,y) \log p(y|x) dx dy = -E[E[\log p(Y)|X]] \tag{98}$$

Mutual Information $$I(X,Y) = H(X) - H(X|Y) = H(Y) - H(Y|X) \tag{99}$$

It should be understood by those skilled in the art that various modifications, combinations sub-combinations and alterations may occur depending on design requirements and other factors insofar as they are within the scope of the appended claims or the equivalents thereof.

What is claimed is:

1. An interaction device for interacting with an object, comprising:
    a central processing unit;
    an input unit that receives input information;
    an output unit that outputs output information;
    a controller that maps the input information into the output information;
    an optimization unit that optimizes the controller,
    wherein the output unit outputs an imitation of a movement of the object,
    wherein the controller implements a Bayesian's estimation that determines a degree of belief or conviction of an existence of an interaction object by comparing past records on the basis of a plurality of variables including a first variable indicating a total number of background periods until a predetermined time point, a second variable indicating a total number of agent periods until the predetermined time point, a third variable indicating a total number of sensors that receive an input within the total number of background periods indicated by the first variable, and a fourth variable indicated a total numbers of sensors that receive an input within the total number of agent periods indicated by the second variable, and
    wherein the controller uses a time counter to determine whether a current time is within an agent period or a background period, and the time counter is set to an initial value when a sensor of the interaction device receives an input and is increased when sensors of the interactive device receive no input for a predetermined time step, and
    wherein the optimization unit optimizes the controller to maximize an expectation of returned information about a hypothesis of an interaction object.

2. The interaction device according to claim 1, wherein the hypothesis includes a presence or an absence of the interaction object.

3. The interaction device according to claim 1, wherein the optimization unit optimizes the controller to minimize a future entropy of the hypothesis.

4. The interaction device according to claim 1, wherein the input unit includes a voice microphone and the output means includes a loud speaker.

5. The interaction device according to claim 1, wherein the output unit further includes an expression unit that outputs an expression, and wherein the expression is changed according to a probability indicating the presence or absence of the interaction object.

6. The interaction device according to claim 1, further comprising:
   a head portion;
   a trunk portion;
   a left arm unit connected to the trunk portion;
   a right arm unit connected to the trunk portion;
   a left leg unit connected to the trunk portion; and
   a right leg unit connected to the trunk portion.

7. An interaction device for interacting with an object, comprising:
   a central processing unit;
   an input unit that receives input information;
   an output unit that outputs output information; and
   a control unit that controls the output unit to perform an action output based on the input information or the output information at a timing when an interaction object's expectation of an acquired information quantity for an existence of the interaction device is maximum,
   wherein the control unit implements a Bayesian's estimation that determines a degree of belief or conviction of an existence of an interaction object by comparing past records on the basis of a plurality of variables including a first variable indicating a total number of background periods until a predetermined time point, a second variable indicating a total number of agent periods until the predetermined time point, a third variable indicating a total number of sensors that receive an input within the total number of background periods indicated by the first variable, and a fourth variable indicated a total numbers of sensors that receive an input within the total number of agent periods indicated by the second variable, and
   wherein the control unit uses a time counter to determine whether a current time is within an agent period or a background period, and the time counter is set to an initial value when a sensor of the interaction device receives an input and is increased when sensors of the interactive device receive no input for a predetermined time step, and
   wherein the output unit outputs an imitation of a movement of the object.

8. The interaction device according to claim 7, which includes a voice microphone, and a loud speaker, Wherein the input and output information includes voice information.

9. An interaction device for interacting with an object, comprising:
   a central processing unit;
   an input unit that receives input information;
   an output unit that outputs output information; and
   a controller for controlling the output unit to perform an action output based on the input information or the output information at a timing when an interaction object's expectation of an acquired information quantity for an existence of the interaction device is maximum,
   wherein the controller implements a Bayesian's estimation that determines a degree of belief or conviction of an existence of an interaction object by comparing past records on the basis of a plurality of variables including a first variable indicating a total number of background periods until a predetermined time point, a second variable indicating a total number of agent periods until the predetermined time point, a third variable indicating a total number of sensors that receive an input within the total number of background periods indicated by the first variable, and a fourth variable indicated a total numbers of sensors that receive an input within the total number of agent periods indicated by the second variable, and
   wherein the controller uses a time counter to determine whether a current time is within an agent period or a background period, and the time counter is set to an initial value when a sensor of the interaction device receives an input and is increased when sensors of the interactive device receive no input for a predetermined time step, and
   wherein the output unit outputs an imitation of a movement of the object.

* * * * *